(12) United States Patent
Huang et al.

(10) Patent No.: US 12,443,661 B2
(45) Date of Patent: Oct. 14, 2025

(54) MODEL PROCESSING METHOD AND RELATED DEVICE

(71) Applicant: HUAWEI TECHNOLOGIES CO., LTD., Guangdong (CN)

(72) Inventors: Jingwei Huang, Wuhan (CN); Mingwei Sun, Wuhan (CN); Shan Huang, Wuhan (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 18/315,844

(22) Filed: May 11, 2023

(65) Prior Publication Data

US 2023/0281250 A1    Sep. 7, 2023

Related U.S. Application Data

(63) Continuation of application No. PCT/CN2021/104960, filed on Jul. 7, 2021.

(30) Foreign Application Priority Data

Nov. 13, 2020   (CN) ........................ 202011273450.X

(51) Int. Cl.
    *G06F 16/90*    (2019.01)
    *G06F 16/901*   (2019.01)
    *G06F 30/20*    (2020.01)

(52) U.S. Cl.
    CPC .......... *G06F 16/9024* (2019.01); *G06F 30/20* (2020.01)

(58) Field of Classification Search
    CPC ...... G06F 16/9024; G06F 30/20; G06F 17/15; G06F 17/16; G06F 17/18
    See application file for complete search history.

(56) References Cited

U.S. PATENT DOCUMENTS

| 7,065,250 | B1* | 6/2006 | Lennon .............. G06V 30/1988 |
| | | | 382/305 |
| 9,324,151 | B2 | 4/2016 | Snavely et al. |
| 10,003,867 | B2* | 6/2018 | Prakash ................ H04L 45/122 |
| 2017/0017892 | A1* | 1/2017 | Bernstein ................ G06F 17/18 |

(Continued)

FOREIGN PATENT DOCUMENTS

CN    103679760 B    6/2016

OTHER PUBLICATIONS

Agarwal et al., "Bundle Adjustment in the Large," Proceeding of 11th European Conference on Computer Vision, Sep. 5-11, 2010, 14 pages.

(Continued)

*Primary Examiner* — Tyler J Torgrimson
(74) *Attorney, Agent, or Firm* — Fish & Richardson P.C.

(57) ABSTRACT

The present disclosure relates to model processing methods and devices. In an example method, a graph structure corresponding to a first model is obtained. The graph structure is randomly segmented to obtain at least two first sets, where each first set includes at least one first independent variable. A value of the first independent variable is updated by using a Levenberg-Marquardt (LM) algorithm. The random segmentation operation and the updating operation are repeatedly performed until a convergence condition of the first model is met to obtain solutions of a plurality of first independent variables in the first model.

20 Claims, 9 Drawing Sheets

(56) References Cited

U.S. PATENT DOCUMENTS

| | | |
|---|---|---|
| 2017/0199920 A1* | 7/2017 | Pearson .................. H04L 67/02 |
| 2018/0246999 A1* | 8/2018 | Feng ........................ G06F 30/20 |
| 2019/0294740 A1* | 9/2019 | Matsubara ............. G06Q 10/04 |
| 2020/0265328 A1* | 8/2020 | Kaditz ................... G06N 3/088 |

OTHER PUBLICATIONS

Zhang et al., "Distributed Very Large Scale Bundle Adjustment by Global Camera Consensus," Proceedings of the IEEE International Conference on Computer Vision,I Oct. 22-29, 2017, 10 pages.
Ni et al., "Out-of-Core Bundle Adjustment for Large-Scale 3D Reconstruction," 2007 IEEE 11th International Conference on Computer Vision, Dec. 26, 2007, 8 pages.

\* cited by examiner

MODEL PROCESSING METHOD AND RELATED DEVICE

CROSS-REFERENCE TO RELATED APPLICATIONS

This application is a continuation of International Application No. PCT/CN2021/104960, filed on Jul. 7, 2021, which application claims priority to Chinese Patent Application No. 202011273450.X, filed on Nov. 13, 2020. The disclosures of the aforementioned applications are hereby incorporated by reference in their entireties.

TECHNICAL FIELD

This application relates to the field of computer software, and in particular, to a model processing method and a related device.

BACKGROUND

Currently, a plurality of problems in computer vision, graphics, or another field can be resolved through modeling. For example, when a problem in an application scenario such as visual positioning, image fusion, three-dimensional reconstruction, optical flow calculation, or curve fitting is resolved, a model can be established and solved, to resolve the problem.

However, with development of times, a quantity of independent variables in a model continuously increases. In a current solving manner, an entire to-be-solved model is used as an input, and a problem that a memory resource cannot support solving may easily occur.

SUMMARY

Embodiments of this application provide a model processing method and a related device to segment a problem of solving a first model including a large quantity of independent variables, so that excessive memory resources do not need to be occupied when a sub-problem is resolved. In addition, a graph structure is segmented in a random segmentation manner, which is easy to implement. This ensures efficiency of a segmentation process. In addition, the problem of solving the first model including the large quantity of independent variables is segmented into problems of solving several submodels including a small quantity of independent variables. This facilitates parallel solving, and improves efficiency of the solving process.

To resolve the foregoing technical problem, embodiments of this application provide the following technical solutions.

According to a first aspect, an embodiment of this application provides a model processing method, which may be applied to the field of model solving. A model processing apparatus configured to perform the method may be a server cluster, an independent server, or a terminal device. The method includes: The model processing apparatus obtains a graph structure corresponding to a first model. The first model includes a plurality of first functions, a plurality of first independent variables correspond to the first model, the graph structure includes nodes and edges between the plurality of nodes, and the nodes in the graph structure one-to-one correspond to the first independent variables, that is, one node in the graph structure points to one first independent variable in the first model. The edges between the plurality of nodes in the graph structure are determined based on the plurality of first functions. Further, if two independent variables are included in a same function, nodes pointing to the two independent variables have a connection relationship. Still further, when one second independent variable and one third independent variable exist in the plurality of first independent variables included in the first model, and the second independent variable and the third independent variable exist in both a second function and a third function of the first model, two edges exist between a node pointing to the second independent variable and a node pointing to the third independent variable. The model processing apparatus randomly segments the graph structure, that is, segments the plurality of first independent variables to which the foregoing nodes point, to obtain at least two first sets, where each first set includes at least one first independent variable. The model processing apparatus updates a value of the first independent variable in each first set by using a Levenberg-Marquardt LM algorithm. The model processing apparatus repeatedly performs the random segmentation operation and the operation of updating the value of the first independent variable in each first set until a convergence condition of the first model is met, to obtain solutions of the plurality of first independent variables in the first model.

In this implementation, after graph structure data corresponding to the first model is obtained, the graph structure indicated by the graph structure data is randomly segmented to obtain the at least two first sets, where each first set includes the at least one first independent variable, that is, all first independent variables in the first model are segmented into a plurality of first sets. Further, the value of the first independent variable in each first set is updated by using the Levenberg-Marquardt LM algorithm, that is, in each iteration process, all the first independent variables in the first model are segmented into the plurality of first sets. In this way, a problem of solving the first model including a large quantity of independent variables is segmented. Because all independent variables in a to-be-solved model need to be stored in a memory at the same time, and a quantity of independent variables included in one submodel is small, when the submodel is solved, only a few independent variables need to be stored using memory resources, that is, a sub-problem is resolved without occupying excessive memory resources. In addition, the graph structure is segmented in a random segmentation manner, and an implementation is simple. This ensures efficiency of a segmentation process. In addition, the problem of solving the first model including the large quantity of independent variables is segmented into problems of solving several submodels including a small quantity of independent variables. This facilitates parallel solving, and improves efficiency of the solving process.

In a possible implementation of the first aspect, each edge in the graph structure corresponds to two nodes, and one node represents one first independent variable in the first model. That the model processing apparatus randomly segments the graph structure to obtain at least two first sets includes: The model processing apparatus randomly sorts a plurality of edges in the graph structure to obtain a plurality of edges arranged in a first order, and obtains a first edge from the plurality of edges in the first order, where the first edge is one of the plurality of edges in the graph structure. The model processing apparatus determines whether two first independent variables corresponding to the first edge have been paired with other nodes, and when neither of the two first independent variables corresponding to the first edge is paired, pairs the two first independent variables corresponding to the first edge to obtain a first subset. If the model processing apparatus performs the foregoing operation on each edge in the graph structure, a plurality of first subsets corresponding to the graph structure are obtained. The plurality of first subsets corresponding to the graph structure may be stored by using a data structure such as a table, a matrix, and a disjoint forest. The model processing apparatus combines the plurality of first subsets corresponding to the graph structure to obtain the at least two first sets.

In this embodiment of this application, a specific implementation of randomly segmenting the graph structure is provided, and two nodes corresponding to a same edge exist in a same set, to improve an association degree of a plurality of independent variables in the same set. This improves a speed of solving the entire first model.

In a possible implementation of the first aspect, when there is one paired independent variable in the two first independent variables corresponding to the first edge, the model processing apparatus may skip an unpaired independent variable in the two first independent variables corresponding to the first edge, and further obtain a next edge from the plurality of edges included in the graph structure in the first order; or directly determine, as one first subset, an unpaired independent variable in the two first independent variables corresponding to the first edge.

In a possible implementation of the first aspect, that the model processing apparatus combines the plurality of first subsets corresponding to the graph structure includes: The model processing apparatus obtains, based on the edges between the plurality of nodes in the graph structure, association degree information corresponding to the plurality of first sub sets. The association degree information indicates an association degree between all of the plurality of first subsets, the association degree information includes a first association degree between a second subset and a third subset, both the second subset and the third subset are any two different subsets of the plurality of first subsets, the first association degree is determined based on an association degree between an independent variable in the second subset and an independent variable in the third subset, and more edges between two nodes indicate a higher association degree between independent variables to which the nodes point. The model processing apparatus combines, based on the association degree information corresponding to the plurality of first subsets, the plurality of first subsets corresponding to the graph structure, where a high association degree between two first subsets indicates a high probability of combining the two first subsets.

In this embodiment of this application, the high association degree between the two first subsets indicates the high probability of combining the two first subsets. In other words, this ensures that independent variables with a high association degree are grouped into a same first set at a high probability. In this way, an association degree between a plurality of first independent variables included in a same first set is improved, and an association degree between first independent variables included in different first sets is reduced. Because a primary server segments all the first independent variables in the first model into the plurality of first sets, and separately solves at least one independent variable included in each first set, a small association degree between the first independent variables included in the two first sets indicates a small conflict in a process of solving the first independent variable in the two first sets. In this way, an entire solving process of the first model can be more efficiently converged, and precision of solving finally obtained independent variables in the entire first model can be improved.

In a possible implementation of the first aspect, the model processing apparatus cyclically performs the combination operation. In one cycle of a plurality of cycles, after obtaining association degree information indicating an association degree between any two first subsets, the model processing apparatus may select at least one group of first subsets with highest association degrees, or select at least one group of first subsets whose association degrees are higher than a first association degree threshold. For any one of the at least one group of first subsets, the model processing apparatus combines independent variables included in each first subset in the one group of first subsets to obtain a combined first subset. The model processing apparatus determines whether a total quantity of independent variables included in the combined first subset is greater than or equal to a first threshold. If the total quantity of independent variables included in the combined first subset is greater than or equal to the first threshold, the combined first subset is determined as one first set, and the combined first subset is removed from a queue of first subsets. If the total quantity of independent variables included in the combined first subset is less than the first threshold, the combined first subset is still in a queue of first subsets. After performing the foregoing operation, the model processing apparatus enters a next cycle, calculates the association degree information indicating the association degree between the any two first subsets again, and performs the combination operation again based on the association degree information.

In a possible implementation of the first aspect, a value of the first threshold is selected based on an upper limit of a quantity of independent variables that can be borne by a memory resource configured for a device used for solving, a quantity of devices used for solving, or another factor.

In a possible implementation of the first aspect, after that the model processing apparatus combines the plurality of first subsets corresponding to the graph structure to obtain the at least two first sets, the method further includes: The model processing apparatus obtains two first independent variables corresponding to a second edge; determines whether the two first independent variables corresponding to the second edge (that is, two first independent variables pointed to by two nodes connected by using the second edge) exist in two different first sets; and if the two first independent variables corresponding to the second edge exist in the two different first sets, removes the two first independent variables corresponding to the second edge from the two different first sets, and respectively determines the two first independent variables corresponding to the second edge as two isolated first independent variables, where the second edge is any one of the plurality of edges in the graph structure. The model processing apparatus performs the foregoing operation on each edge in the graph structure. Correspondingly, that the model processing apparatus updates a value of the first independent variable in each first set by using a Levenberg-Marquardt LM algorithm includes: The model processing apparatus updates the value of the first independent variable in each first set and a value of the isolated first independent variable by using the Levenberg-Marquardt LM algorithm. That the model processing apparatus repeatedly performs the random segmentation operation and the operation of updating the value of the first independent variable in each first set includes: The model processing apparatus repeatedly performs the random segmentation operation and the operation of updating the value of the first independent variable in each first set and the value of the isolated first independent variable.

In this embodiment of this application, in the foregoing manner, it can be ensured that different first sets do not include independent variables corresponding to a same edge. This greatly reduces an association degree between first independent variables included in different first sets, and eliminates the conflict in the process of solving the first independent variables in the two first sets. The entire solving process of the first model can be further improved to converge more efficiently, and the resolution precision of the finally obtained independent variables in the entire first model can be improved.

In a possible implementation of the first aspect, that the model processing apparatus performs iterative update on the value of the first independent variable in each first set by using the Levenberg-Marquardt LM algorithm includes: The model processing apparatus obtains a second model corresponding to the first independent variable in the first set, where the second model includes at least one second function, and the at least one second function is determined based on the plurality of first functions included in the first model. Specifically, the first model includes the plurality of first functions. The model processing apparatus may determine one by one whether each first function includes any first independent variable in the first set; if yes, obtain the first function; and convert, based on a first value of each first independent variable, an independent variable in the first function other than the independent variable included in the first set into a constant, to obtain a second function. For example, first independent variables included in a target first set are $x_1$, $x_2$, and $x_3$, and three first functions related to $x_1$, $x_2$, and $x_3$ in the first model are $x_1-x_2$, $x_2-x_3$, and $x_3-x_4$. A first value of $x_4$ is 7. In this case, three second functions corresponding to $x_1$, $x_2$, and $x_3$ are $x_1-x_2$, $x_2-x_3$, and $x_3-7$. The example herein is merely used to describe a difference between the second function and the first function. The model processing apparatus obtains, by using the Levenberg-Marquardt LM algorithm, a function value of each second function in the at least one second function based on a first value of each first independent variable in the first set and the at least one second function. The first value is a value of the first independent variable before the update, and the first value of the first independent variable may be an initial value of the first independent variable or a value generated by the first independent variable in a previous iteration. The model processing apparatus calculates, by using the Levenberg-Marquardt LM algorithm, a Jacobian matrix corresponding to the second function. A non-zero term in the Jacobian matrix includes a derivative of a first scalar with respect to a second independent variable, the first scalar is a sum of values of all second functions corresponding to the first independent variable in the first set, the second independent variable is an independent variable forming the at least one second function, different second independent variables have different locations in the second function, and different first independent variables have different identifiers. In other words, the second independent variables are a result of reorganizing the first independent variables based on a receiving order of the second functions. For example, the second model is minimize$_x$ $(x_3-x_7)^2+(x_1-x_7)^2+(x_2-x_6)^2+(x_3-x_5)^2+(x_1-x_4)^2$, and there are ten second independent variables corresponding to a plurality of second functions in the second model: $y_{1,1}=x_3$, $y_{1,2}=x_7$, $y_{2,1}=x_1$, $y_{2,2}=x_7$, $y_{3,1}=x_2$, $y_{3,2}=x_6$, $y_{4,1}=x_3$, $y_{4,2}=x_5$, $y_{5,1}=x_1$, and $y_{5,2}=x_4$. $y_{1,1}$ is an independent variable located in a first term of the first function of a model shown in formula (3), and $y_{1,2}$ is an independent variable located in a second term of the first function of the model shown in formula (3). It can be learned that independent variables at different locations in the plurality of second functions are different second independent variables. There are seven first independent variables corresponding to the plurality of second functions in the second model, which are respectively from $x_1$ to $x_7$. $x_1$ and $x_2$ are different identifiers, and $x_2$ and $x_3$ are different identifiers. In other words, different first independent variables have different identifiers. The example herein is merely used to describe a difference between the first independent variable and the second independent variable. The model processing apparatus generates a second value of the first independent variable in the first set by using the Levenberg-Marquardt LM algorithm and based on the first value of each first independent variable in the first set, the function value of the second function, and the Jacobian matrix, where the second value is a value after update.

In this embodiment of this application, an AI processor provides only a function of automatically calculating a derivation of a scalar with respect to an independent variable. The Jacobian matrix corresponding to the second function is a derivative of a vector function with respect to the first independent variable, and therefore cannot be directly completed by using the AI processor. However, in this implementation, the first independent variable is segmented, so that the non-zero term in the Jacobian matrix corresponding to the second function may be expressed as the derivative of the first scalar with respect to the second independent variable. In this way, the value of the first independent variable may be directly updated by using the AI processor. In other words, a manner of calculating the Jacobian matrix according to this implementation can be compatible with the AI processor. This helps improve efficiency of an update process of the value of the first independent variable, and improves efficiency of an entire solution process.

In a possible implementation of the first aspect, the convergence condition of the first model is that a value of the first model is less than the first threshold, or a difference between the second value and the first value is less than a second threshold. In this embodiment of this application, two representation forms of the convergence condition of the first model are provided. This improves implementation flexibility of this solution.

In a possible implementation of the first aspect, the first model is a least square model, and the first model is used in any one of the following application scenarios: three-dimensional modeling, image fusion, face reconstruction, and grid deformation. In this embodiment of this application, a plurality of application scenarios of embodiments of this application are provided. This improves implementation flexibility of this solution.

According to a second aspect, an embodiment of this application provides a model processing method, which may be used in the field of model solving. The method may include: A first model processing apparatus obtains a graph structure corresponding to a first model. The first model includes a plurality of first functions, the first model includes a plurality of first independent variables, the graph structure includes a plurality of nodes and edges between the plurality of nodes, the node in the graph structure corresponds to the first independent variable, and the edges between the plurality of nodes in the graph structure are determined based on the plurality of first functions. The first model processing apparatus randomly segments the graph structure to obtain at least two first sets, where each first set includes at least one first independent variable. The at least two first sets indicate a second model processing apparatus to update a value of the first independent variable in each first set by using a Levenberg-Marquardt LM algorithm. The first model processing apparatus receives a value after update of the first independent variable sent by the second model processing apparatus. The first model processing apparatus repeatedly performs the random segmentation operation and the operation of receiving the value after update of the first independent variable until a convergence condition of the first model is met, to obtain solutions of the plurality of first independent variables in the first model.

In a possible implementation of the second aspect, each edge in the graph structure corresponds to two nodes, and one node represents one first independent variable in the first model. That the first model processing apparatus randomly segments the graph structure to obtain at least two first sets includes: The first model processing apparatus randomly sorts a plurality of edges in the graph structure to obtain a plurality of edges arranged in a first order, and obtains a first edge from the plurality of edges in the first order, where the first edge is one of the plurality of edges in the graph structure; when neither of two first independent variables corresponding to the first edge is paired, pairs the two first independent variables corresponding to the first edge to obtain a first subset; and combines a plurality of first subsets corresponding to the graph structure to obtain the at least two first sets.

In a possible implementation of the second aspect, that the first model processing apparatus combines the plurality of first subsets corresponding to the graph structure includes: The first model processing apparatus obtains, based on the edges between the plurality of nodes in the graph structure, association degree information corresponding to the plurality of first subsets. The association degree information indicates an association degree between all of the plurality of first subsets, the association degree information includes a first association degree between a second subset and a third subset, both the second subset and the third subset are any two different subsets of the plurality of first subsets, the first association degree is determined based on an association degree between an independent variable in the second subset and an independent variable in the third subset, and more edges between two nodes indicate a higher association degree between independent variables to which the nodes point. The first model processing apparatus combines, based on the association degree information corresponding to the plurality of first subsets, the plurality of first subsets corresponding to the graph structure, where a high association degree between two first subsets indicates a high probability of combining the two first subsets.

In a possible implementation of the second aspect, after that the first model processing apparatus combines the plurality of first subsets corresponding to the graph structure to obtain the at least two first sets, the method further includes: If two first independent variables corresponding to a second edge exist in two different first sets, the first model processing apparatus removes the two first independent variables corresponding to the second edge from the two different first sets, and respectively determines the two first independent variables corresponding to the second edge as two isolated first independent variables, where the second edge is any one of the plurality of edges in the graph structure. The at least two first sets and the isolated first independent variable indicate the second model processing apparatus to update the value of the first independent variable in each first set and a value of the isolated first independent variable by using the Levenberg-Marquardt LM algorithm.

In the second aspect of this application, a composition module of the first model processing apparatus may be further configured to perform steps performed by the model processing apparatus in each possible implementation of the first aspect. For details, refer to description in the first aspect and the possible implementations of the first aspect. Details are not described herein again.

According to a third aspect, an embodiment of this application provides a model processing method, which may be used in the field of model solving. The method may include: A second model processing apparatus obtains at least one second function corresponding to a first independent variable in a first set, where the at least one second function is determined based on a plurality of first functions included in a first model. The second model processing apparatus updates a value of the first independent variable in the first set by using a Levenberg-Marquardt LM algorithm, and sends a value after update of the first independent variable to a first model processing apparatus.

In a possible design of the third aspect, that the second model processing apparatus updates a value of the first independent variable in the first set by using a Levenberg-Marquardt LM algorithm includes: obtaining a function value of the second function through calculation by using the Levenberg-Marquardt LM algorithm and based on a first value of each first independent variable in the first set and the second function, where the first value is a value of the first independent variable before update; calculating, by using the Levenberg-Marquardt LM algorithm, a Jacobian matrix corresponding to the second function, where the Jacobian matrix includes a derivative of a first scalar with respect to a second independent variable, the first scalar is a sum of values of all second functions corresponding to the first independent variable in the first set, the second independent variable is an independent variable forming the second function, different second independent variables have different locations in the second function, and different first independent variables have different identifiers; and generating a second value of the first independent variable in the first set by using the Levenberg-Marquardt LM algorithm and based on the first value of each first independent variable in the first set, the function value of the second function, and the Jacobian matrix, where the second value is a value after update.

In the third aspect of this application, a composition module of the second model processing apparatus may be further configured to perform steps performed by the model processing apparatus in each possible implementation of the first aspect. For details, refer to description in the first aspect and the possible implementations of the first aspect. Details are not described herein again.

According to a fourth aspect, an embodiment of this application provides a model processing apparatus, which may be used in the field of model solving. The apparatus may include: an obtaining module, configured to obtain graph structure data corresponding to a first model, where the first model includes a plurality of first functions, the first model includes a plurality of first independent variables, a graph structure includes a plurality of nodes and edges between the plurality of nodes, the node in the graph structure corresponds to the first independent variable, and the edges between the plurality of nodes in the graph structure are determined based on the plurality of first functions; a segmentation module, configured to randomly segment the graph structure to obtain at least two first sets, where each first set includes at least one first independent variable; an update module, configured to update a value of the first independent variable in each first set by using a Levenberg-Marquardt LM algorithm; and a cyclic module, configured to repeatedly perform the random segmentation operation and the operation of updating the value of the first independent variable in each first set until a convergence condition of the first model is met, to obtain solutions of the plurality of first independent variables in the first model.

A composition module of the model processing apparatus according to the fourth aspect of this application may be further configured to perform steps performed by the model processing apparatus in each possible implementation of the first aspect. For details, refer to description in the first aspect and the possible implementations of the first aspect. Details are not described herein again.

According to a fifth aspect, an embodiment of this application provides a model processing apparatus, including a processor, where the processor is coupled to a memory; and the memory, configured to store a program. The processor is configured to execute the program in the memory, so that an execution device performs the steps in each possible implementation according to the first aspect, the second aspect, or the third aspect.

According to a sixth aspect, an embodiment of this application provides a computer-readable storage medium, where the computer-readable storage medium stores a computer program. When the computer program runs on a computer, the computer is enabled to perform the model processing method according to the first aspect, the second aspect, or the third aspect.

According to a seventh aspect, an embodiment of this application provides a computer program. When the computer program runs on a computer, the computer is enabled to perform the model processing method according to the first aspect, the second aspect, or the third aspect.

According to an eighth aspect, this application provides a chip system. The chip system includes a processor, configured to support a terminal device or a server to implement functions in the foregoing aspects, for example, sending or processing data and/or information in the foregoing methods. In a possible design, the chip system further includes a memory. The memory is configured to store program instructions and data that are necessary for the terminal device or a communication device. The chip system may include a chip, or may include a chip and another discrete device.

DESCRIPTION OF EMBODIMENTS

The following describes embodiments of this application with reference to the accompanying drawings. A person of ordinary skill in the art may learn that, with development of technologies and emergence of a new scenario, the technical solutions according to embodiments of this application are also applicable to a similar technical problem.

In the specification, claims, and the accompanying drawings of this application, the terms "first", "second", and the like are intended to distinguish between similar objects but do not necessarily indicate a specific order or sequence. It should be understood that the terms used in such a way are interchangeable in proper circumstances, and this is merely a distinguishing manner used when objects that have a same attribute are described in embodiments of this application. In addition, terms "include", "have", and any other variations thereof are intended to cover a non-exclusive inclusion, so that a process, method, system, product, or device that includes a series of units is not limited to those units, but may include other units not expressly listed or inherent to such a process, method, product, or device.

It should be understood that a first model processing method according to embodiments of this application may be applied to various application scenarios in which a problem is resolved by establishing a first model and solving the first model. The first model may be specifically represented as a neural network or a function. Further, the function may be a least square function or another type of function. Still further, the foregoing function may be a non-linear function, a linear function, or the like. It should be understood that in embodiments of this application, only an example in which the first model is a non-linear least square first model is used. When the first model is the another type of first model, reference may be made. For example, embodiments of this application may be applied to three-dimensional modeling, image fusion, face reconstruction, grid deformation, image positioning, another application scenario, or the like. Application scenarios of embodiments of this application are not exhaustively listed herein.

Figure 1A:
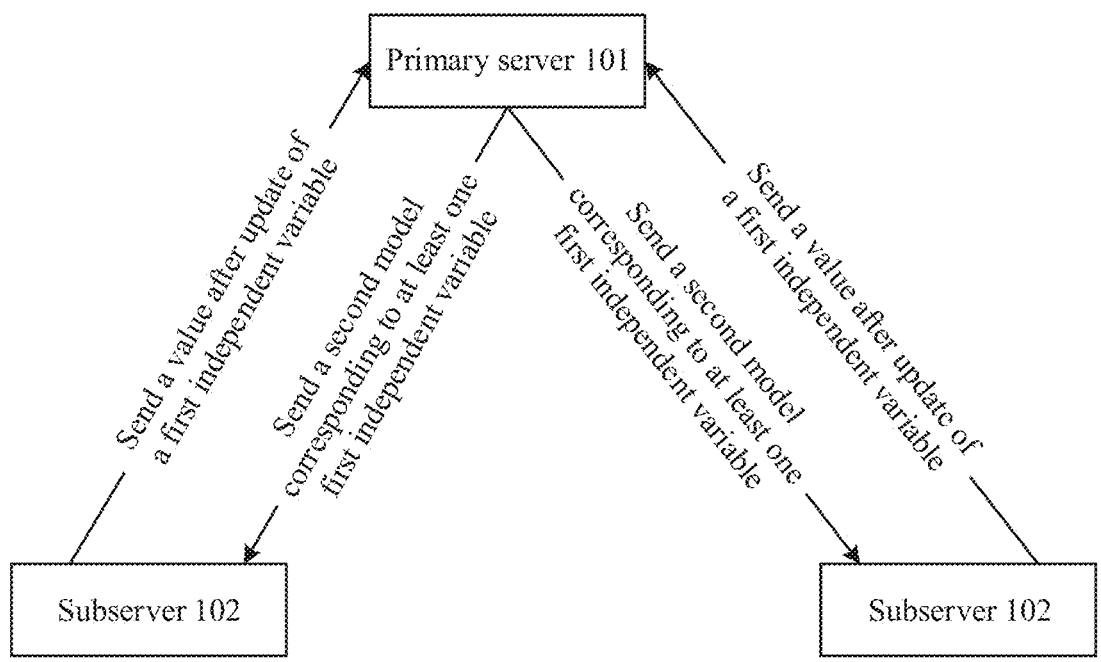
FIG. 1a is a schematic system diagram of a model processing system according to an embodiment of this application.
Figure 1B:
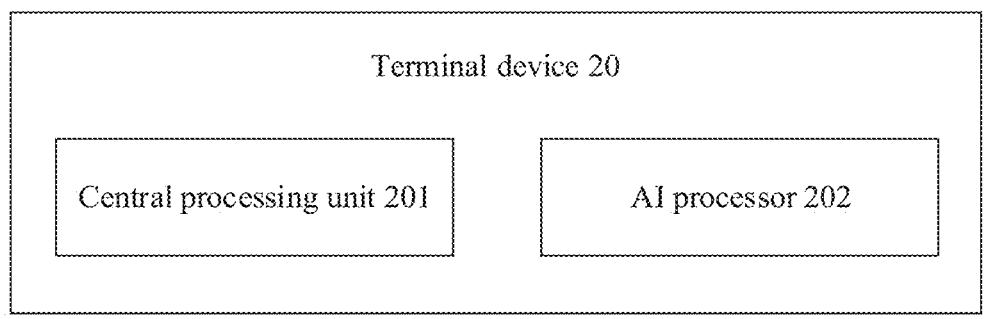
FIG. 1B is another schematic system diagram of a model processing system according to an embodiment of this application.

In the foregoing scenarios, there may be a problem that a memory resource cannot support an excessively large quantity of independent variables included in an established model. To resolve the foregoing problem, an embodiment of this application provides a model processing method. The following first describes a model processing system according to an embodiment of this application with reference to FIG. 1a and FIG. 1B. FIG. 1a and FIG. 1B are respectively schematic diagrams of two systems of the model processing system according to this embodiment of this application. In FIG. 1a, an example in which the model processing system is specifically represented as a server cluster is used. The server cluster includes a primary server 101 and a subserver 102. After obtaining graph structure data corresponding to a first model, the primary server 101 randomly segments a graph structure (that is, randomly segments a plurality of nodes in the graph structure) to obtain at least two first sets, where each first set includes at least one first independent variable. In other words, the primary server segments the first model into several small second models. Each second model includes at least one second function, and a quantity of independent variables included in the second model is less than a quantity of independent variables included in the first model. The primary server allocates a plurality of first sets to a plurality of subservers 102. The plurality of subservers 102 update a value of the first independent variable in each first set in parallel, and send a value after update to the primary server 101 to determine, by using the primary server 101, whether a convergence condition of the first model is met. If the convergence condition is not met, the primary server 101 performs the random segmentation operation again, and the subserver 102 performs the operation of updating the value of the first independent variable in each first set again until the convergence condition of the first model is met, to obtain a solution of each first independent variable in the first model. Although FIG. 1a shows one primary server 101 and two subservers 102, a quantity of primary servers 101 and a quantity of subservers 102 are not limited in this embodiment of this application.

In FIG. 1B, the model processing system is specifically represented as a terminal device 20. The terminal device 20 includes both a central processing unit (central processing unit, CPU) 201 and an artificial intelligence (artificial intelligence, AI) processor 202. Specifically, the central processing unit 201 may perform the steps performed by the primary server in FIG. 1a, and the AI processor 202 may perform the steps performed by the subserver in FIG. 1a.

Because the large first model is segmented into the several small second models, excessive memory resources do not need to be occupied when a sub-problem is resolved. It should be noted that the model processing system may also be represented as that there is only one server, and the foregoing server completes the random segmentation operation and the operation of updating the value of the first independent variable in each first set.

The following begins to describe a specific implementation procedure of the model processing method according to embodiments of this application.

Figure 2:
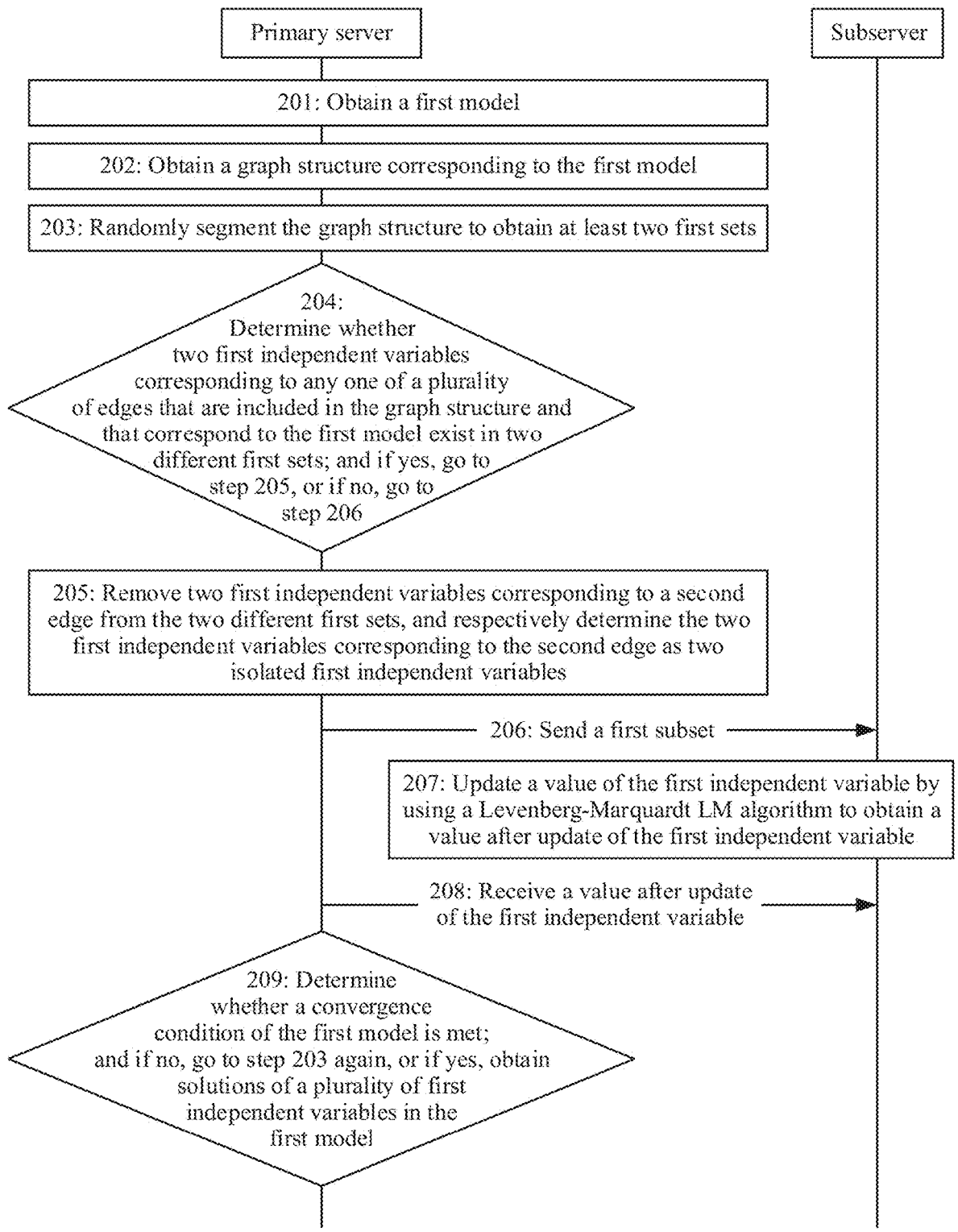
FIG. 2 is a schematic flowchart of a model processing method according to an embodiment of this application.

In some embodiments of this application, an example in which a model processing system is the system shown in FIG. 1a is used. FIG. 2 is a schematic flowchart of a model processing method according to an embodiment of this application. The model processing method provided in this embodiment of this application may include the following steps.

201: A primary server obtains a first model.

In this embodiment of this application, in one case, the primary server may directly receive the first model sent by a client. The first model is used to resolve a problem in a specific application scenario. The first model includes a plurality of first functions, each first function has a plurality of first independent variables, and different first functions may have a same first independent variable. Specific types of the first model and the first independent variable should be determined with reference to an actual application scenario and an actual to-be-resolved problem. For example, in an application scenario in which the first model is used to perform image fusion, an example in which an image B is fused into a first area of an image A is used. In this case, a fusion target is that a boundary color of the first area is expected to be close to that of the image A as much as possible; and that a relative value between an internal color of the first area and a periphery of the first area, and a relative value between the image B and the periphery of the first area are consistent as much as possible. In this case, the first independent variable in the first model may include a color value of a pixel at a boundary of the first area, a color value of a pixel inside the first area, another independent variable, or the like. For another example, if the first model is used to reconstruct a face, the first model may be used to express the face. The first independent variable in the first model may include coordinates of a feature point in a face image, and the like. It should be understood that the example herein is merely for ease of understanding an application scenario of this embodiment of this application, and is not intended to limit this solution.

Specifically, the first model sent by the client may be based on a function template, a Lambda expression, or in another form. After receiving the first model sent by the client, the primary server may describe the first model in a language readable by the server. To be specific, the plurality of first independent variables corresponding to the first model, a variable index corresponding to each independent variable in each first function, and a calculation manner of each first function are generated. For example, the first model is as follows:

$$\text{minimize}_x \ (x_1 - x_2)^2 + (x_2 - x_3)^2 + (x_3 - x_4)^2 + \qquad (1)$$
$$(x_4 - x_5)^2 + (x_5 - x_6)^2 + (x_7 - x_8)^2 + (x_8 - x_9)^2.$$

Formula (1) represents the first model; $(x_1-x_2)$, $(x_2-x_3)$, $(x_3-x_4)$, ..., $(x_7-x_8)$, and $(x_8-x_9)$ all represent the first function; and $x_1$ to $x_9$ represent nine first independent variables corresponding to the first model. The server may establish a variable index $s_{i,y}$ corresponding to each term in each first function, and $s_{i,y}$ represents an index of a $j^{th}$ independent variable in an $i^{th}$ function of the first model. For example $s_{2,2}$ represents an index of a second independent variable $x_3$ in a second function of the first model, and the $i^{th}$ first function is any function of a plurality of first functions included in the first model. It should be understood that the example in formula (1) is merely for ease of understanding of this solution, and is not intended to limit this solution.

In another case, the primary server may receive raw data that is sent by the client and that corresponds to the to-be-resolved problem, and further generate the first model based on the to-be-resolved problem and the raw data. For example, if the client wants to fuse the image B into the first area of the image A, the primary server may receive an image fusion request sent by the client, where the image fusion request carries location information (that is, the raw data corresponding to the to-be-resolved problem) of the image B, the image A, and the first area. In this way, after receiving the image fusion request and the raw data, the primary server may generate the first model, and convert the first model into the language readable by the server. It should be understood that the example herein is merely for ease of understanding of this solution, and is not intended to limit this solution.

202: The primary server obtains a graph structure corresponding to the first model.

In this embodiment of this application, after obtaining the first model, the primary server generates the graph structure corresponding to the first model. Graph structure data includes node data and edge data. The primary server may store the graph structure data in a form of an adjacency table. The first model includes the plurality of first functions, the first model includes the plurality of first independent variables, the graph structure includes a plurality of nodes and edges between the plurality of nodes, and the node in the graph structure corresponds to the first independent variable. The edges between the plurality of nodes in the graph structure are determined based on the plurality of first functions. Further, if two independent variables are included in a same function, nodes pointing to the two independent variables have a connection relationship. Still further, when one second independent variable and one third independent variable exist in the plurality of first independent variables included in the first model, and the second independent variable and the third independent variable exist in both a second function and a third function of the first model, two edges exist between a node pointing to the second independent variable and a node pointing to the third independent variable.

Figure 3:
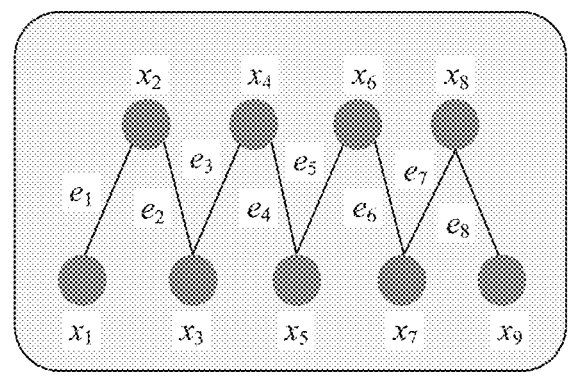
FIG. 3 is a schematic diagram of a graph structure in a model processing method according to an embodiment of this application.

For more intuitive understanding of this solution, FIG. 3 is a schematic diagram of a graph structure in a model processing method according to an embodiment of this application. The graph structure shown in FIG. 3 is a graph structure corresponding to formula (1), where nine nodes in FIG. 3 respectively point to the nine first independent variables $x_1$, $x_2$, $x_3$, $x_4$, $x_5$, $x_6$, $x_7$, $x_8$, and $x_9$ in the first model, and eight edges in FIG. 3 are: $e_1$, $e_2$, $e_3$, $e_4$, $e_5$, $e_6$, $e_7$, and $e_8$. Because both $x_1$ and $x_2$ are included in the first function of formula (1), there is an edge $e_1$ between $x_1$ and $x_2$. Because both $x_2$ and $x_3$ are included in the second function of formula (1), there is an edge $e_2$ between $x_2$ and $x_3$. Remaining edges are not described herein one by one.

Graph data that is generated in the primary server and that corresponds to the graph structure in FIG. 3 includes node data and edge data, where the node data $V=\{x_1, x_2, x_3, x_4, x_5, x_6, x_7, x_8, x_9\}$ corresponding to the graph structure, and the edge data $E=\{e_1, e_2, e_3, e_4, e_5, e_6\}$ corresponding to the graph structure. Further, $e_1=<x_1, x_2>$, $e_2=<x_2, x_3>$, $e_3=<x_3, x_4>$, $e_4=<x_4, x_5>$, $e_5=<x_5, x_6>$, $e_6=<x_6, x_7>$, $e_7=<x_7, x_8>$, and $e_8=<x_8, x_9>$. An index variable corresponding to each first function of the first model is $S=\{<1,2>, <2,3>, <3,4>, <4,5>, <5,6>, <6,7>, <7,8>, <8,9>\}$. It should be understood that the example in FIG. 3 is merely for ease of understanding of this solution, and is not intended to limit this solution.

203: The primary server randomly segments the graph structure to obtain at least two first sets.

In this embodiment of this application, after generating the graph structure data corresponding to the first model, the primary server needs to randomly segment the plurality of nodes in the graph structure, that is, segments the plurality of first independent variables to which the foregoing nodes point, to obtain the at least two first sets, where each first set includes at least one first independent variable.

Specifically, in an implementation, the primary server randomly sorts the plurality of edges of the graph structure to obtain a plurality of edges arranged in a first order, and sequentially traverses the plurality of edges in the first order. For any traversed edge (that is, a first edge), the primary server determines whether two first independent variables corresponding to the first edge have been paired with other nodes, and when neither of the two first independent variables corresponding to the first edge is paired, pairs the two first independent variables corresponding to the first edge to obtain a first subset. After performing the foregoing operation on each edge in the graph structure in the first order, the server may obtain a plurality of first subsets corresponding to the graph structure. The processor may store the plurality of first subsets corresponding to the graph structure by using a data structure such as a table, a matrix, and a disjoint forest. The primary server combines the plurality of first subsets corresponding to the graph structure to obtain the at least two first sets. In this embodiment of this application, a specific implementation of randomly segmenting the graph structure is provided, and two nodes corresponding to a same edge exist in a same set, to improve an association degree of a plurality of independent variables in the same set. This improves a speed of solving the entire first model.

Further, when there is one paired independent variable in the two first independent variables corresponding to the first edge, the primary server may skip an unpaired independent variable in the two first independent variables corresponding to the first edge, and further obtain a next edge from the plurality of edges included in the graph structure in the first order; or directly determine, as one first subset, an unpaired independent variable in the two first independent variables corresponding to the first edge.

Figure 4:
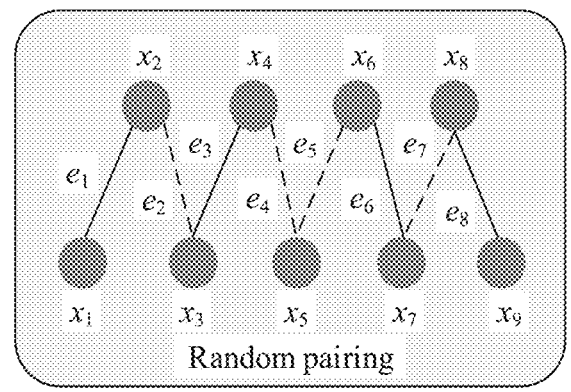
FIG. 4 is a schematic diagram of a plurality of first subsets in a model processing method according to an embodiment of this application.

To more intuitively understand the foregoing random pairing process of the primary server, FIG. 4 is a schematic diagram of a plurality of first subsets in a model processing method according to an embodiment of this application, and FIG. 4 is an example with reference to the graph structure in FIG. 3. Two first independent variables connected by using a solid line in FIG. 4 represent two first independent variables that are successfully paired (that is, two first independent variables forming a same first subset), and two first independent variables connected by using a dashed line in FIG. 4 represent that there is no pairing relationship. Specifically, the primary server disorders the plurality of edges $E=\{e_1, e_2, e_3, e_4, e_5, e_6, e_7, e_8\}$ of the graph structure shown in FIG. 3 into $E=\{e_3, e_2, e_1, e_4, e_6, e_5, e_8, e_7\}$. The primary server sequentially traverses $e_3$, $e_2$, $e_1$, $e_4$, $e_6$, $e_5$, $e_8$, and $e_7$ (that is, sequentially reads each edge according to a first order obtained after random disorder). The primary server first obtains $e_3$, and obtains two first independent variables: $x_3$ and $x_4$, which correspond to $e_3$. The primary server determines that neither of $x_3$ and $x_4$ is paired, and pairs $x_3$ and $x_4$ to obtain one first subset (Corresponding to FIG. 4, the solid line is between $x_3$ and $x_4$). Two first independent variables: $x_2$ and $x_3$ are obtained, which correspond to $e_2$. Because $x_3$ has been paired with $x_4$, the primary server skips the first independent variable $x_2$ (Corresponding to FIG. 4, the dashed line is between $x_2$ and $x_3$). The two first independent variables that are obtained by the primary server and that correspond to $x_1$ and $x_2$ are: $e_1$. The primary server determines that neither of $x_1$ and $x_2$ is paired, and pairs $x_1$ and $x_2$ to obtain one first subset (Corresponding to FIG. 4, the dashed line is between $x_1$ and $x_2$). Similarly, because $x_4$ has been paired, the primary server does not pair $e_4$, and skips the first independent variable $x_5$ (Corresponding to FIG. 4, the dashed line is between $x_4$ and $x_5$). Similarly, for $e_6$, the primary server pairs $e_6$ with two corresponding first independent variables $x_6$ and $x_7$ to obtain one first subset. For a pairing process of $e_5$, $e_8$, and $e_7$, refer to the foregoing description. Details are not described herein again. It should be understood that the example in FIG. 4 is merely for ease of understanding of this solution, and is not intended to limit this solution.

For a process in which the primary server combines the plurality of first subsets corresponding to the graph structure, in an implementation, the primary server obtains, based on the edges between the plurality of nodes in the graph structure, association degree information corresponding to the plurality of first subsets. The association degree information indicates an association degree between all of the plurality of first subsets. The primary server combines, based on the association degree information corresponding to the plurality of first subsets, the plurality of first subsets corresponding to the graph structure to obtain the at least two first sets, where a high association degree between two first subsets indicates a high probability of combining the two first subsets. In this embodiment of this application, after the plurality of first subsets are obtained, the combination operation is performed by using the association degree between the plurality of first subsets. The high association degree between the two first subsets indicates the high probability of combining the two first subsets. In other words, this ensures that independent variables with a high association degree are grouped into a same first set at a high probability. In this way, an association degree between a plurality of first independent variables included in a same first set is improved, and an association degree between first independent variables included in different first sets is reduced. Because the primary server segments all first independent variables in the first model into a plurality of first sets, and separately solves at least one independent variable included in each first set, a small association degree between the first independent variables included in the two first sets indicates a small conflict in a process of solving the first independent variable in the two first sets. In this way, an entire solving process of the first model can be more efficiently converged, and precision of solving finally obtained independent variables in the entire first model can be improved.

More specifically, the association degree information includes a first association degree between a second subset and a third subset, both the second subset and the third subset are any two different subsets of the plurality of first subsets, the first association degree is determined based on an association degree between an independent variable in the second subset and an independent variable in the third subset, and more edges between two nodes indicate a higher association degree between independent variables to which the nodes point. For a process in which the primary server generates the association degree information, the primary server obtains edge data of the graph structure corresponding to the first model. The edge data not only indicates whether any two nodes in the graph structure are connected, but also indicates a quantity of edges between any two nodes in the graph structure. The primary server obtains at least one independent variable included in the second subset, obtains at least one independent variable included in the third subset, calculates a sum of association degrees between each independent variable in the second subset and each independent variable in the third subset, and therefore obtains an association degree between the second subset and the third subset. A quantity of edges between two independent variables may be directly determined as an association degree between the two independent variables, or the association degree between the two independent variables may be obtained after the quantity of edges between the two independent variables is converted. The primary server performs the foregoing operation on any two different first subsets of the plurality of first subsets to obtain an association degree between the any two first subsets, that is, obtain association degree information.

An example is provided with reference to FIG. 3 and FIG. 4. The second subset includes $x_3$ and $x_4$, and the third subset includes $x_1$ and $x_2$. It can be learned from FIG. 3 that there is an edge between $x_3$ and $x_2$, and an association degree between $x_3$ and $x_2$ is 1. There is no edge between $x_3$ and $x_1$, and an association degree between $x_3$ and $x_1$ is 0. There is no edge between $x_4$ and $x_2$, and an association degree between $x_4$ and $x_2$ is 0. There is no edge between $x_4$ and $x_1$, and an association degree between $x_4$ and $x_1$ is 0. Therefore, the association degree between the second subset and the third subset is 1. It should be understood that the example herein is merely for ease of understanding of this solution, and is not intended to limit this solution. Further, the primary server may store the association degree information by using a matrix, a table, or another data structure. For more intuitive understanding of this solution, the following uses an example of information included in the association degree information with reference to Table 1.

TABLE 1

| Association degree | First subset 1 | First subset 2 | First subset 3 | First subset 4 |
| --- | --- | --- | --- | --- |
| First subset 1 | Null | 2 | 1 | 1 |
| First subset 2 | 2 | Null | 3 | 4 |
| First subset 3 | 1 | 3 | Null | 2 |
| First subset 4 | 1 | 4 | 2 | Null |

As shown in Table 1, the association degree between the first set 1 and the first set 2 is 2, the association degree between the first set 1 and the first set 3 is 1, the association degree between the first set 1 and the first set 4 is 1, and the like. The rest may be deduced by analogy, and remaining content in Table 1 is not described herein again.

For a process in which the primary server combines the plurality of first subsets by using the association degree information, the primary server cyclically performs the combination operation. In one cycle of a plurality of cycles, after obtaining the association degree information indicating an association degree between any two first subsets, the primary server may select at least one group of first subsets with highest association degrees, or select at least one group of first subsets whose association degrees are higher than a first association degree threshold. For any one of the at least one group of first subsets, the primary server combines independent variables included in each first subset in the one group of first subsets to obtain a combined first subset. It should be noted that, if association degrees between a first subset and two different first subsets are the same, a combination operation may be performed on one first subset that is randomly selected from the two different first subsets. For example, if the association degree between the first subset 1 and the first subset 2 is 3, and the association degree between the first subset 1 and the first subset 3 is 3, one first subset may be randomly selected from the first subset 2 and the first subset 3 to be combined with the first subset 1. It should be understood that the example herein is merely for ease of understanding of this solution, and is not intended to limit this solution.

The primary server may preset a first threshold, and determine whether a total quantity of independent variables included in the combined first subset is greater than or equal to the first threshold. If the total quantity of independent variables included in the combined first subset is greater than or equal to the first threshold, the combined first subset is determined as one first set, and the combined first subset is removed from a queue of first subsets. If the total quantity of independent variables included in the combined first subset is less than the first threshold, the combined first subset is still in a queue of first subsets. After performing the foregoing operation, the primary server enters a next cycle, calculates the association degree information indicating the association degree between the any two first subsets again, and performs the combination operation again based on the association degree information.

A value of the first threshold is selected based on an upper limit of a quantity of independent variables that can be borne by a memory resource configured for a device used for solving, a quantity of devices used for solving, another factor, or the like, which is not exhaustive herein. For example, if the upper limit of the quantity of independent variables that can be borne by the memory resource configured for the device used for solving is eight independent variables, the value of the first threshold is less than or equal to 4. For another example, if there are three devices used for solving, a quantity of first sets needs to be greater than or equal to 3, and therefore the value of the first threshold is affected by affecting the quantity of first sets.

For more intuitive understanding of this solution, an example is provided with reference to the foregoing Table 1. An example in which the value of the first threshold is ten, the first subset 3 includes four independent variables, and the first subset 4 includes two independent variables is used. After generating the association degree information shown in Table 1, the primary server selects a group of first subsets with highest association degrees as the first subset 4 and the first subset 3, and combines the independent variables included in the first subset 4 and the independent variables included in the first subset 3 to obtain a combined first subset. If determining that a quantity of independent variables included in the combined first subset is less than ten, the primary server retains the combined first subset in the queue of first subsets. This completes one cycle. It should be understood that the example herein is merely for ease of understanding of this solution, and is not intended to limit this solution.

In another implementation, after obtaining the plurality of first subsets corresponding to the graph structure, the primary server may also perform the combination operation in the cyclic manner. In each cycle, the primary server randomly selects two first subsets from the plurality of first subsets, and combines the two selected first subsets to obtain a combined first subset. The primary server determines whether a quantity of independent variables included in the combined first subset is greater than or equal to the first threshold. The combined first subset is determined as one first set, and the combined first subset is removed from the queue of first subsets. If the total quantity of independent variables included in the combined first subset is less than the first threshold, the combined first subset is still in the queue of first subsets. After performing the foregoing operation, the primary server enters a next cycle, randomly selects two first subsets from the plurality of first subsets again, and performs the combination operation again.

It should be noted that the primary server may alternatively randomly segment the graph structure in another manner, which is not exhaustive herein.

204: The primary server determines whether two first independent variables corresponding to any one of the plurality of edges that are included in the graph structure and that correspond to the first model exist in two different first sets; and if yes, goes to step 205, or if no, goes to step 206.

In some embodiments of this application, after combining the plurality of first subsets corresponding to the graph structure to obtain the at least two first sets, the primary server further traverses each edge in the graph structure corresponding to the first model (that is, sequentially obtains each edge from the plurality of edges corresponding to the graph structure), to determine whether the two first independent variables corresponding to each edge in the graph structure exist in two different first sets. Specifically, a second edge is any one of the plurality of edges included in the graph structure. The primary server obtains two first independent variables corresponding to the second edge, and determines whether the two first independent variables (that is, two first independent variables pointed to by two nodes connected by using the second edge) corresponding to the second edge exist in two different first sets; and if yes, goes to step 205, or if no, goes to step 206.

An example is provided with reference to FIG. 3 and FIG. 4. For example, the first set 1 includes $x_1$, $x_2$, $x_3$, and $x_4$, the second set 2 includes $x_5$, $x_6$, and $x_7$, and the first set 3 includes $x_8$ and $x_9$. The primary server obtains the two first independent variables $x_1$ and $x_2$ corresponding to an edge $e_1$, and both $x_1$ and $x_2$ exist in the first set 1. The primary server obtains the two first variables $x_2$ and $x_3$ corresponding to an edge $e_2$, and both $x_2$ and $x_3$ exist in the first set 1. The primary server obtains the two first variables $x_3$ and $x_4$ corresponding to an edge $e_3$, and both $x_3$ and $x_4$ exist in the first set 1. The primary server obtains the two first variables $x_4$ and $x_5$ corresponding to an edge $e_4$, and $x_4$ and $x_5$ do not exist in a same first subset. In this case, go to step 205. For an implementation of $e_5$, $e_6$, $e_7$, and $e_8$, refer to the foregoing description. Details are not described herein again. It should be understood that the example herein is merely for ease of understanding of this solution, and is not intended to limit this solution.

205: The primary server removes the two first independent variables corresponding to the second edge from the two different first sets, and respectively determines the two first independent variables corresponding to the second edge as two isolated first independent variables.

In some embodiments of this application, when determining that the two first independent variables corresponding to the second edge exist in the two different first sets, the primary server removes the two first independent variables corresponding to the second edge from the two different first sets, and respectively determines the two first independent variables corresponding to the second edge as the two isolated first independent variables.

An example is provided with reference to the example in step 204. Because the two first variables $x_4$ and $x_5$ corresponding to the edge $e_4$ are respectively located in the first set 1 and the first set 2, $x_4$ and $x_5$ are respectively removed from the first set 1 and the first set 2. To be specific, the first independent variables included in the first set 1 change to $x_1$, $x_2$, and $x_3$, the first independent variables included in the first set 2 change to $x_6$ and $x_7$, and $x_4$ and $x_5$ are respectively determined as two isolated first independent variables. It should be understood that the example herein is merely for ease of understanding of this solution, and is not intended to limit this solution.

It should be noted that, after determining, by using step 204, that the two first independent variables corresponding to the second edge exist in the two different first sets, the primary server goes to step 205; and after performing step 205 and before traversing each edge, goes to step 204 again to determine whether two first independent variables corresponding to a next edge exist in two different first sets until each edge in the graph structure is traversed.

Further, the primary server may preset a first quantity threshold for determining, where a value of the first quantity threshold is a total quantity of graph structures corresponding to the first model. When a quantity of times that the primary server performs the determining step in step 204 is less than the first quantity threshold, it is considered that all edges in the graph structure are not traversed completely. When a quantity of times that the primary server performs the determining step in step 204 is equal to the first quantity threshold, it is considered that the primary server has traversed all edges in the graph structure.

In this embodiment of this application, in the foregoing manner, it can be ensured that different first sets do not include independent variables corresponding to a same edge. This greatly reduces an association degree between first independent variables included in different first sets, and completely eliminates the conflict in the process of solving the first independent variables in the two first sets. The entire solving process of the first model can be further improved to converge more efficiently, and resolution precision of finally obtained independent variables in the entire first model can be improved.

206: The primary server separately sends the plurality of first sets to different subservers.

In this embodiment of this application, because step 204 and step 205 are optional steps, if step 204 and step 205 are not performed, the primary server may directly go to step 206 after performing step 203, and the primary server separately sends the plurality of first sets obtained in step 203 to different subservers, so that values of the first independent variable are updated in parallel by using a plurality of different subservers. If performing steps 204 and 205, the primary server separately returns the plurality of first sets and at least one isolated first independent variable to different subservers to update the values of the first independent variable in parallel by using the plurality of different sub servers.

Specifically, in an implementation, the primary server may send the first model, a first value of each first independent variable in the first model, and the first set (or the isolated first independent variable) to the subserver. Therefore, the subserver generates, based on the first model, the first value of each first independent variable in the first model, and the first set (or the isolated first independent variable), a second model corresponding to the first independent variable (or the isolated first independent variable) in the first set. The second model includes at least one second function, and the sub server updates the value of the first independent variable (or the isolated first independent variable) in the first set, that is, updates a value of at least one first independent variable included in the at least one second function.

The first value of each first independent variable in the first model may be an initial value of each first independent variable, or may be a value of each first independent variable generated during a previous iteration. Further, a method for determining the initial value of each first independent variable needs to be determined with reference to an actual application scenario. For example, when the first model is applied to an image fusion scenario, the initial value of each first independent variable is an initial color value of a pixel of a to-be-fused picture. In another example, for example, if the first model is applied to an application scenario of three-dimensional reconstruction, the initial value of each first independent variable may be obtained through calculation by using a preorder algorithm.

In another implementation, the primary server may generate, based on the first model, a first value of each first independent variable in the first model, and the first set, a second model corresponding to the first independent variable in the first set, where the second model includes at least one second function; and directly send the at least one second function corresponding to the first independent variable in the first set to the subserver.

Specifically, for a step of obtaining at least one second function corresponding to at least one first independent variable included in a target first set, the primary server or the subserver obtains the at least one first independent variable included in the target first set, where the first model includes the plurality of first functions. The primary server may determine whether any first independent variable in the target first set exists in each first function one by one; if no, continue to perform the foregoing operation on a next first function; and if yes, obtain the first function, and convert, based on the first value of each first independent variable, an independent variable in the first function other than the independent variable included in the target first set into a constant, to obtain a second function. To be specific, if an independent variable that does not exist in the target first set exists in a first function, the independent variable that does not exist in the target first set is considered as a scalar. In other words, a first value corresponding to the independent variable that does not exist in the target first set is substituted into the first function, to obtain the second function. The primary server performs the foregoing operation on each first function to obtain the second function corresponding to the first independent variable included in the target first set.

For example, if the first model is the foregoing formula (1), first independent variables included in the target first set include $x_1$, $x_2$, and $x_3$. First values of $x_1$, $x_2$, $x_3$, $x_4$, $x_5$, $x_6$, $x_7$, $x_8$, and $x_9$ are respectively 2, 3, 6, 7, 4, 2, 1, 5, and 3, and a second model corresponding to $x_1$, $x_2$, and $x_3$ is as follows:

$$\text{minimize}_x (x_1-x_2)^2+(x_2-x_3)^2+(x_3-7)_2 \qquad (2).$$

Formula (2) represents the second model corresponding to a plurality of first independent variables included in the target first set, and the second model includes a plurality of second functions. A difference between the second model and the first model, and a difference between the second function and the first function may be determined by comparing Formula (2) and Formula (1). Details are not described herein again.

207: The subserver updates the value of the first independent variable by using a Levenberg-Marquardt LM algorithm to obtain a value after update of the first independent variable.

In this embodiment of this application, if a first set is allocated to a single subserver, the subserver updates, by using the LM algorithm, values of all first independent variables included in the first set to obtain values after update of all the first independent variables included in the first set. If an isolated first independent variable is allocated to a single subserver, the subserver updates a value of the isolated first independent variable by using the LM algorithm to obtain a value after update of the isolated first independent variable.

Specifically, the subserver needs to obtain at least one second function corresponding to all first independent variables (or isolated first independent variables) included in one first set, and updates, by using the Levenberg-Marquardt (Levenberg-maquardt, LM) algorithm, values of all the first independent variables (or the isolated first independent variables) included in the one first set to obtain values after update of all the first independent variables (or the isolated first independent variables) included in the one first set. A formula of the LM algorithm is as follows:

$$x^* = x_k - (J^T J + \lambda_k I)^{-1} J^T f(x_k).$$

$x^*$ represents the value after updates (that is, second values) of all the first independent variables included in the one first set; $x_k$ represents the values before update (that is, first values) of all the first independent variables included in the one first set; J represents a Jacobian matrix of $f(x_k)$ for $x_k$; $J^T$ represents a transpose of J; $\lambda_k$ is a hyperparameter in each iteration process, and may have different values in different iterations to control an iteration step; I is an identity matrix; and −1 represents taking an inverse of the matrix.

Figure 5:
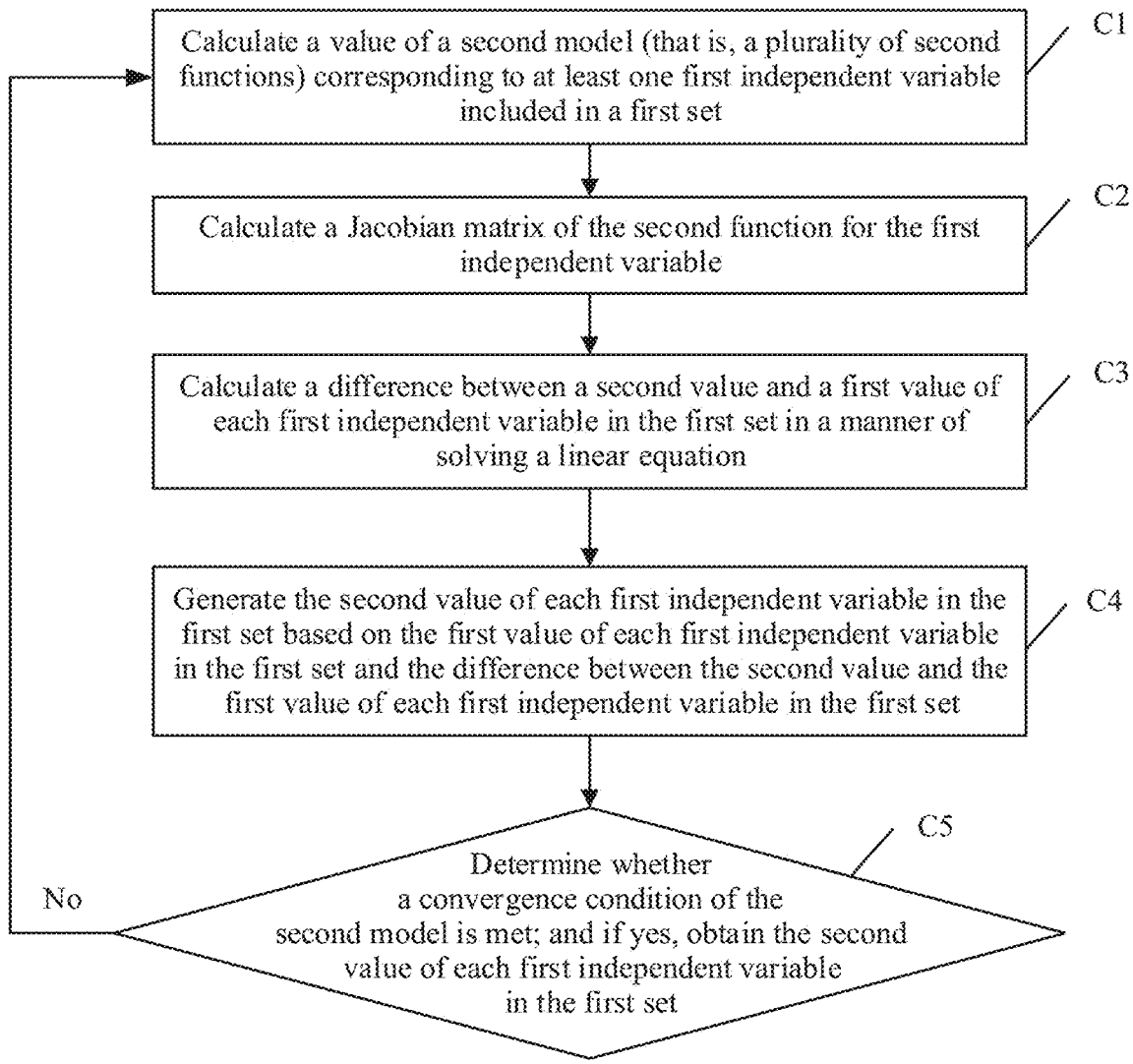
FIG. 5 is a schematic flowchart of updating a value of an independent variable by using a Levenberg-Marquardt LM algorithm in a model processing method according to an embodiment of this application.

For more intuitive understanding of a process of updating the first independent variable by using the Levenberg-Maquardt (Levenberg-maquardt, LM) algorithm, FIG. 5 is a schematic flowchart of updating a value of an independent variable by using a Levenberg-Marquardt LM algorithm in a model processing method according to an embodiment of this application. Specifically, C1: Calculate a value of the second model (that is, the plurality of second functions) corresponding to the at least one first independent variable included in the first set, that is, calculate a value of $f(x_k)$; C2: Calculate a Jacobian matrix of the second function with respect to the first independent variable, that is, calculate the Jacobian matrix of $f(x_k)$ for $x_k$; C3: Calculate a difference between the second value and the first value of each first independent variable in the first set in a manner of solving a linear equation; C4: Generate the second value of each first independent variable in the first set based on the first value of each first independent variable in the first set and the difference between the second value and the first value of each first independent variable in the first set; and C5: Determine whether a convergence condition of the second model is met, where the convergence condition of the second model includes any one of the following: The value of the second model is less than the first threshold, or the difference between the second value and the first value of the first independent variable is less than a second threshold; if the convergence condition of the second model is met, obtain the second value of each first independent variable in the first set; and if the convergence condition of the second model is not met, go to step C1 again to perform a next round of update on values of a plurality of first independent variables included in the second model until the convergence condition of the second model is met.

The subserver may calculate, in two manners, the Jacobian matrix corresponding to the second function. In an implementation, the subserver calculates a derivative of a first scalar with respect to a second independent variable to obtain a non-zero term in the Jacobian matrix, and further obtains the Jacobian matrix corresponding to the second function.

Specifically, the subserver obtains the at least one second function corresponding to the first independent variable (or the isolated first independent variable) in the first set, where the at least one second function is determined based on the plurality of first functions included in the first model. For a specific manner of obtaining the at least one second function and the difference between the second function and the first function, refer to description in step 206. Details are not described herein again. The subserver obtains a function value of the second function through calculation by using the LM algorithm and based on the first value of each first independent variable (or isolated first independent variable) in the first set and the second function, to obtain the function value of the second function (that is, calculate the value of $f(x_k)$). The first value is a value before the first independent variable is updated.

The subserver calculates, by using the LM algorithm, the Jacobian matrix corresponding to the second function, where the non-zero term in the Jacobian matrix includes the derivative of the first scalar with respect to the second independent variable. The first scalar is a sum of values of all second functions corresponding to the first independent variable in the first set, the second independent variable is an independent variable forming the at least one second function, different second independent variables have different locations in the second function, and different first independent variables have different identifiers. In other words, the second independent variables are a result of reorganizing the first independent variables based on a receiving order of the second functions. For example, the second model is as follows:

$$\text{minimize}_x (x_3-x_7)^2 + (x_1-x_7)^2 + (x_2-x_6)^2 + (x_3-x_5)^2 + (x_1-x_4)^2 \qquad (3).$$

Formula (3) represents the second model, an index corresponding to a plurality of independent variables in the second model S1={<3,7>, <1,7>, <2,6>, <3,5>, <1,4>}, and there are ten second independent variables corresponding to the plurality of second functions in the second model: $y_{1,1}=x_3$, $y_{3}$, $y_{1,2}=x_7$, $y_{2,1}=x_1$, $y_{2,2}=x_7$, $y_{3,1}=x_2$, $y_{3,2}=x_6$, $y_{4,1}=x_3$, $y_{4,2}=x_5$, $y_{5,1}=x_1$, and $y_{5,2}=x_4$. $y_{1,1}$ is an independent variable located in a first term of the first function of a model shown in formula (3), and $y_{1,2}$ is an independent variable located in a second term of the first function of the model shown in formula (3). It can be learned that independent variables at different locations in the plurality of second functions are different second independent variables. There are seven first independent variables corresponding to the plurality of second functions in the second model, which are respectively from $x_1$ to $x_7$. $x_1$ and $x_2$ are different identifiers, and $x_2$ and $x_3$ are different identifiers. In other words, different first independent variables have different identifiers. It should be understood that the example in formula (3) is merely for ease of understanding a difference between the first independent variable and the second independent variable, and is not intended to limit this solution.

The subserver calculates, in the manner of solving the linear equation, the difference between the second value and the first value of each first independent variable in the first set by using the LM algorithm and based on the function value of the second function and the Jacobian matrix; and generates the second value of the first independent variable in the first set based on the difference between the second value and the first value of each first independent variable in the first set, and the first value of each first independent variable in the first set, where the second value is the value after update.

In this embodiment of this application, an AI processor provides only a function of automatically calculating a derivation of a scalar with respect to an independent variable. The Jacobian matrix corresponding to the second function is a derivative of a vector function with respect to the first independent variable, and therefore cannot be directly completed by using the AI processor. However, in this implementation, the first independent variable is segmented, so that the non-zero term in the Jacobian matrix corresponding to the second function may be expressed as the derivative of the first scalar with respect to the second independent variable. In this way, the value of the first independent variable may be directly updated by using the AI processor. In other words, a manner of calculating the Jacobian matrix according to this implementation can be compatible with the AI processor. This helps improve efficiency of an update process of the value of the first independent variable, and improves efficiency of an entire solution process.

The following describes, in a formula conversion manner, a derivation principle that the non-zero term in the Jacobian matrix corresponding to the second function can be converted into the derivative of the first scalar with respect to the second independent variable:

$$J_r(x)_{i,s_{i,j}} = \frac{\partial r_i}{\partial x_{s_{i,j}}} = \frac{\partial r_i}{\partial y_{i,j}} = \frac{\partial r_i}{\partial y_{i,j}} \times \frac{\partial L}{\partial r_i} = \frac{\partial L}{\partial y_{i,j}} = (\nabla_y L)_{i,j}. \quad (4)$$

$J_r(x)i,s_{i,j}$ represents a value of an $i^{th}$ row and a $j^{th}$ column (that is, a non-zero term) in the Jacobian matrix corresponding to the second function;

$$\frac{\partial r_i}{\partial x_{s_{i,j}}}$$

represents a derivative of an $i^{th}$ function with respect to a first independent variable located in a $j^{th}$ term in the $i^{th}$ function, that is, an original meaning of a value in the Jacobian matrix; $\partial r_i/\partial y_{i,j}$ represents a derivative of the $i^{th}$ function with respect to a second independent variable located in the $j^{th}$ term in the $i^{th}$ function; $\partial L/\partial r_i$ represents a derivative of the first scalar with respect to the $i^{th}$ function; and $\partial L/\partial y_{i,j}$ represents a derivative of the first scalar with respect to the second independent variable located in the $j^{th}$ term in the $i^{th}$ function.

More specifically, for a process of generating the Jacobian matrix, when performing the operation by using the AI processor, the sub server obtains a variable index corresponding to the second model (that is, the at least one second function), the plurality of first independent variables, and the at least one second function included in the second model. The sub server packs, into a tensor, the plurality of first independent variables corresponding to the second model (that is, the at least one second function), and inputs the variable index corresponding to the second model (that is, the at least one second function) and the plurality of first independent variables into an indexer in the AI processor to perform reindexing by using the indexer based on an order in which the first independent variables appear in the plurality of second functions, to obtain values of a plurality of second independent variables. The subserver calculates a function value of the at least one second function based on the at least one second function included in the second model and the values of the plurality of second independent variables, and accumulates function values of all the second functions to obtain a value of the first scalar. Further, the AI processor calculates the derivative of the first scalar with respect to the second independent variable to obtain a value of the non-zero term in the Jacobian matrix corresponding to the second function. Further, generated non-zero terms are placed in corresponding locations of the Jacobian matrix to obtain the entire Jacobian matrix corresponding to the second function.

Figure 6:
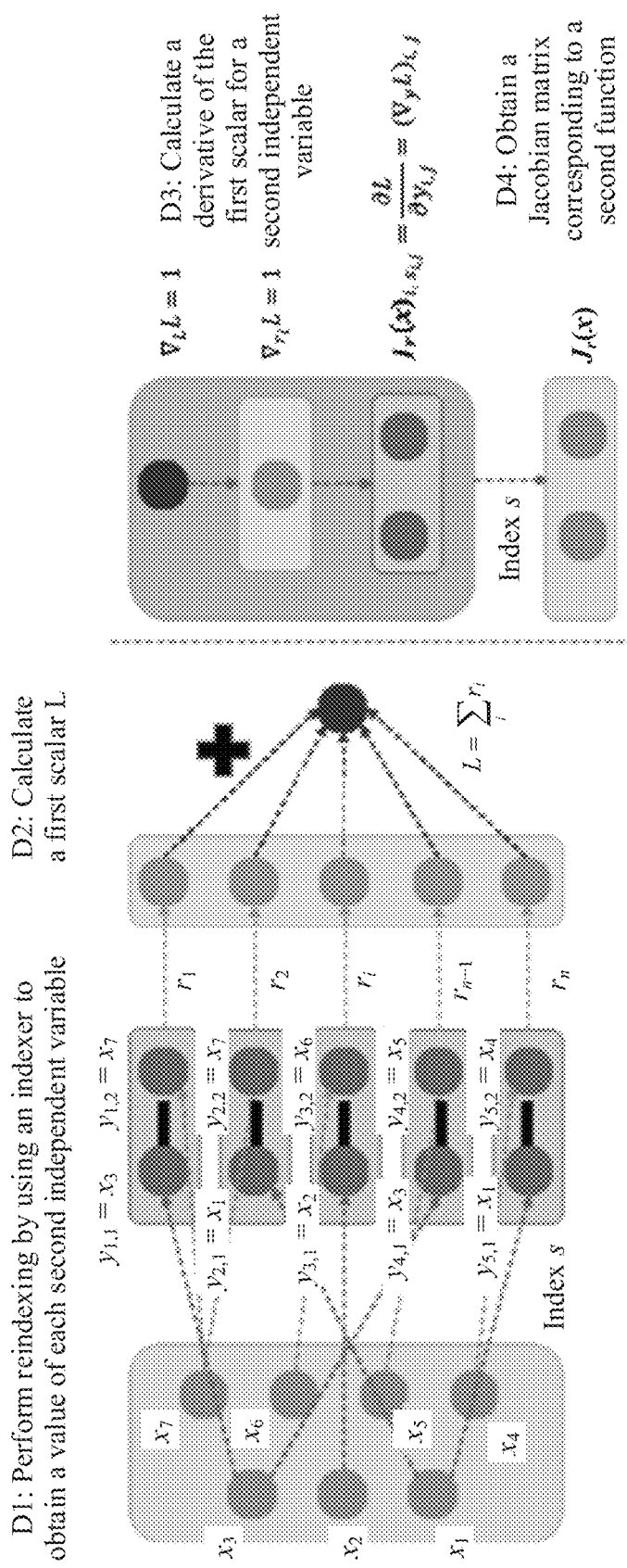
FIG. 6 is a schematic diagram of generating a Jacobian matrix in a model processing method according to an embodiment of this application.

For more intuitive understanding of this solution, FIG. 6 is a schematic diagram of generating a Jacobian matrix in a model processing method according to an embodiment of this application. D1: The subserver inputs the variable index (that is, an index S in FIG. 6) and the plurality of first independent variables (that is, from $x_1$ to $x_7$ in FIG. 6) corresponding to the second model (that is, the at least one second function) into the indexer in the AI processor to perform reindexing by using the indexer based on the variable index corresponding to the second model (that is, the at least one second function), to obtain a value of each second independent variable (that is, from $y_{1,1}$ to $y_{5,2}$ in FIG. 6). D2: The subserver calculates a value of each second function (that is $r_1$, $r_2$, $r_i$, $r_n$, and $r_{n-1}$ shown in FIG. 6) based on the value of each second independent variable, and further calculates a value of a first scalar L (that is, a sum of function values of all the second functions), where the plurality of second functions included in the second model shown in FIG. 6 are: $r_1=y_{1,1}-y_{1,2}$, $r_2=y_{2,1}-y_{2,2}$, $r_3=y_{3,1}-y_{3,2}$, $r_4=y_{4,1}-y_{4,2}$, and $r_5=y_{5,1}-y_{5,2}$; and the first scalar $L=r_1+r_2+r_3+r_4+r_5$. D3: The subserver automatically calculates a derivative of the first scalar L with respect to each second independent variable by using the AI processor. Description is provided with reference to FIG. 6. Specifically, $\{\nabla_y L_{1,1}, \nabla_y L_{1,2}, \nabla_y L_{2,1}, \nabla_y L_{2,2}, \nabla_y L_{3,1}, \nabla_y L_{3,2}, \nabla_y L_{4,1}, \nabla_y L_{4,2}, \nabla_y L_{5,1}, \nabla_y L_{5,2}\}$ is included. D4: The subserver maps, by using the variable index (that is, the index S in FIG. 6) corresponding to the second model (that is, the at least one second function), the value calculated in D3 to the Jacobian matrix corresponding to the second function to obtain the Jacobian matrix corresponding to the second function. Derivatives of the first scalar with respect to the second independent variable (that is, $(\nabla_y L)_{i,j}$) are values of the $i^{th}$ row and the $j^{th}$ column in the Jacobian matrix, and are specifically: $J_{1,3}=\nabla_y L_{1,1}$, $J_{1,7}=\nabla_y L_{1,2}$, $J_{2,1}=\nabla_y L_{1,1}$, $J_{1,7}=\nabla_y L_{1,2}$, $J_{3,2}=\nabla_y L_{1,1}$, $J_{1,6}=\nabla_y L_{1,2}$, $J_{4,3}=\nabla_y L_{1,1}$, $J_{1,5}=\nabla_y L_{1,2}$, $J_{5,1}=\nabla_y L_{1,1}$, and $J_{1,4}=\nabla_y L_{1,2}$. It should be understood that the example in FIG. 6 is merely for ease of understanding of this solution, and is not intended to limit this solution.

In another implementation, the subserver directly calculates the derivative of the second function with respect to the first independent variable to obtain the Jacobian matrix. Step 207 may include: The sub server obtains the at least one second function corresponding to the first independent variable (or the isolated first independent variable) in the first set, and adds the first value of each first independent variable (or the isolated first independent variable) in the first set to the second function by using the LM algorithm to obtain the function value of the second function (that is, calculate the value of $f(x_k)$). The subserver directly calculates, by using the LM algorithm, the Jacobian matrix corresponding to the second function, that is, directly calculates the derivative of the second function with respect to the first independent variable. Further, the subserver calculates, in the manner of solving the linear equation, the difference between the second value and the first value of each first independent variable in the first set by using the LM algorithm and based on the function value of the second function and the Jacobian matrix; and generates the second value of the first independent variable in the first set based on the difference between the second value and the first value of each first independent variable in the first set, and the first value of each first independent variable in the first set, where the second value is the value after update.

208: The primary server receives the value after update that is of the first independent variable and that is sent by the subserver.

In this embodiment of this application, after generating the value after update (that is, the second value) of the first independent variable, each subserver sends the value after update of the first independent variable to the primary server. Correspondingly, the primary server receives the value after update that is of the first independent variable and that is sent by each sub server, and summarizes values after update.

209: The primary server determines whether a convergence condition of the first model is met; and if no, goes to step 203 again, or if yes, obtains solutions of the plurality of first independent variables in the first model.

In this embodiment of this application, the primary server determines, based on the value after update of the first independent variable, whether the convergence condition of the first model is met; and if yes, goes to step 203 again to repeatedly perform the random segmentation operation and the operation of updating the value of the first independent variable in each first set until the convergence condition of the first model is met, or if yes, obtains the solutions of the plurality of first independent variables in the first model to further send the solutions of the plurality of first independent variables in the first model to the client.

The convergence condition of the first model is that a value of the first model is less than the first threshold, or the difference between the second value and the first value is less than the second threshold. In this embodiment of this application, two representation forms of the convergence condition of the first model are provided. This improves implementation flexibility of this solution.

It should be noted that, although in the embodiment corresponding to FIG. 2, the model processing system is represented in a form of a server cluster. To be specific, the primary server and a plurality of subservers are included. In an actual case, the model processing system may alternatively be represented as one server. In this case, the foregoing step performed by the subserver needs to be performed by the primary server, and steps 206 and 208 are not needed.

Figure 7:
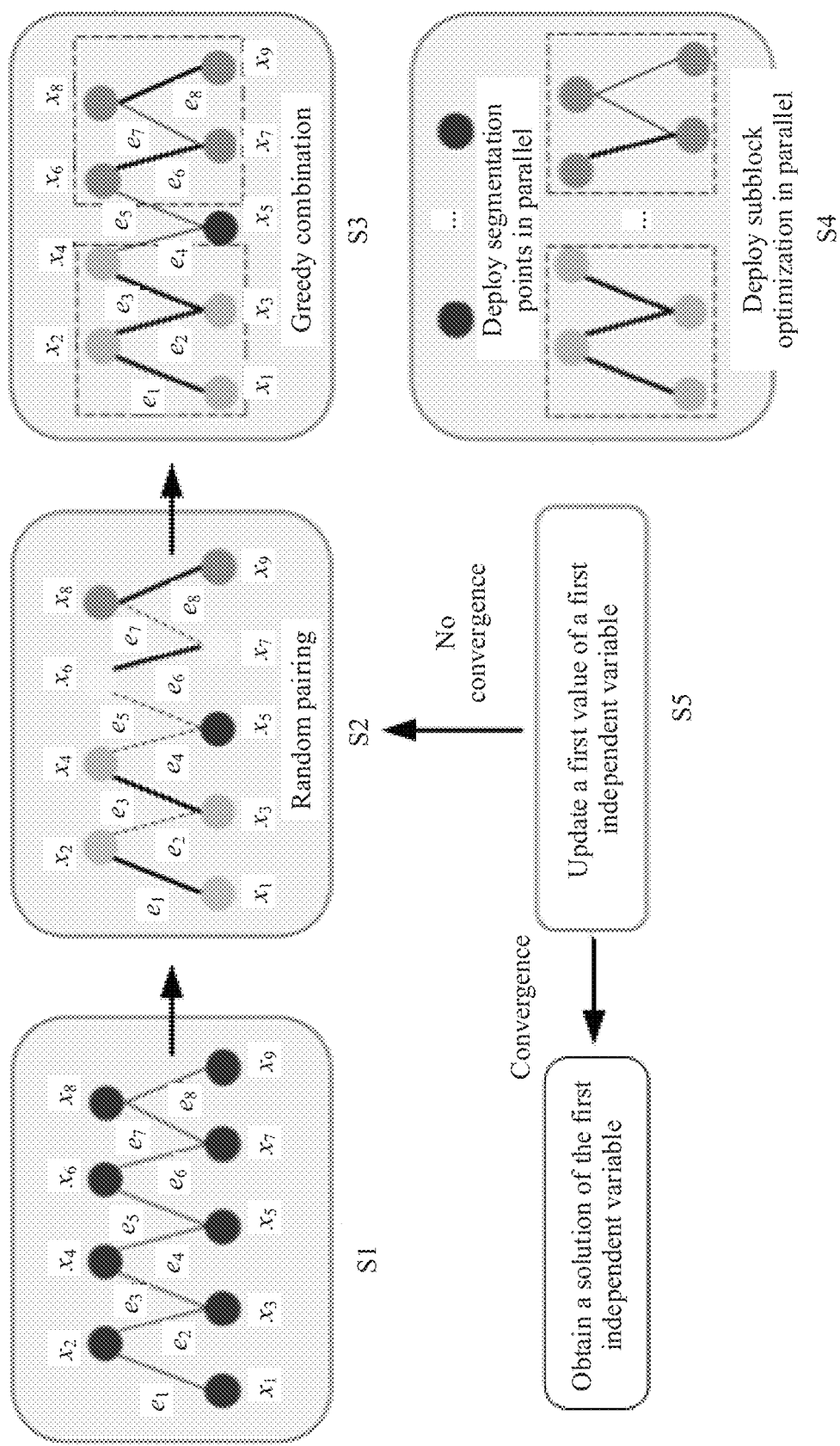
FIG. 7 is another schematic flowchart of a model processing method according to an embodiment of this application.

For more intuitive understanding of this solution, FIG. 7 is a schematic flowchart of a model processing method according to an embodiment of this application. S1: The primary server obtains graph structure data corresponding to a first model. S2: The primary server performs random matching on the graph structure data corresponding to the first model to obtain a plurality of first subsets corresponding to a graph structure. S3: The primary server combines the plurality of first subsets to obtain at least two first sets and at least two isolated first independent variables. S4: The primary server separately deploys the at least two first sets and the at least two isolated first independent variables on different subservers. S5: Different subservers update a first value of the first independent variable by using a Levenberg-Marquardt LM algorithm to obtain a value after update (that is, a second value) of the first independent variable. The primary server determines, based on the second value of the first independent variable, whether a convergence condition is met; and if the convergence condition is met (that is, convergence in FIG. 6), obtains a solution of the first independent variable, or if the convergence condition is not met (that is, no convergence in FIG. 6), goes to step S2 again. It should be understood that the example in FIG. 6 is merely for ease of understanding of this solution, and is not intended to limit this solution.

In this embodiment of this application, after the graph structure data corresponding to the first model is obtained, the graph structure indicated by the graph structure data is randomly segmented to obtain the at least two first sets, where each first set includes at least one first independent variable, that is, all first independent variables in the first model are segmented into a plurality of first sets. Further, the value of the first independent variable in each first set is updated by using the Levenberg-Marquardt LM algorithm, that is, in each iteration process, all the first independent variables in the first model are segmented into the plurality of first sets. In this way, a problem of solving the first model including a large quantity of independent variables is segmented. Because all independent variables in a to-be-solved model need to be stored in a memory at the same time, and a quantity of independent variables included in one submodel is small, when the submodel is solved, only a few independent variables need to be stored using memory resources, that is, a sub-problem is resolved without occupying excessive memory resources. In addition, the graph structure is segmented in a random segmentation manner, and an implementation is simple. This ensures efficiency of a segmentation process. In addition, the problem of solving the first model including the large quantity of independent variables is segmented into problems of solving several submodels including a small quantity of independent variables. This facilitates parallel solving, and improves efficiency of the solving process.

Figure 8:
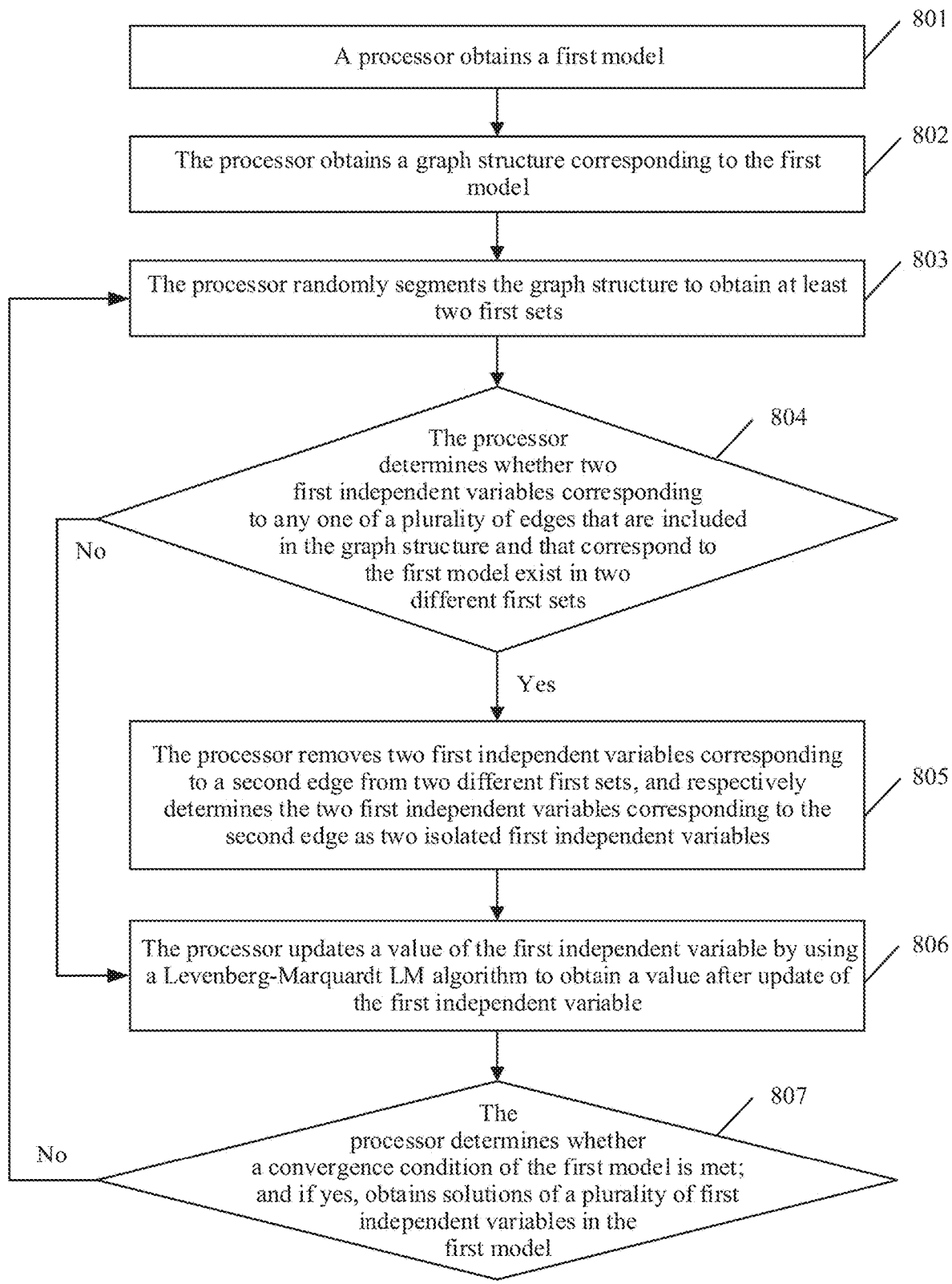
FIG. 8 is still another schematic flowchart of a model processing method according to an embodiment of this application.

In some embodiments of this application, an example in which a model processing system is the terminal device shown in FIG. 1B is used. FIG. 8 is a schematic flowchart of a model processing method according to an embodiment of this application. The model processing method provided in this embodiment of this application may include the following steps.

801: A processor obtains a first model.

802: The processor obtains a graph structure corresponding to the first model.

803: The processor randomly segments the graph structure to obtain at least two first sets.

804: The processor determines whether two first independent variables corresponding to any one of a plurality of edges that are included in the graph structure and that correspond to the first model exist in two different first sets; and if yes, goes to step 805, or if no, goes to step 806.

805: The processor removes two first independent variables corresponding to a second edge from two different first sets, and respectively determines the two first independent variables corresponding to the second edge as two isolated first independent variables.

In this embodiment of this application, specific implementations of steps 801 to 805 are similar to specific implementations of steps 201 to 205. A difference lies in that steps 201 to 205 are performed by the primary server, and steps 801 to 805 are performed by the processor in the terminal device.

For example, the first model may be applied to adjustment optimization performed on three-dimensional modeling. Specifically, three-dimensional modeling is performed based on a plurality of pictures. Adjustment optimization is optimization of a camera parameter and optimization of coordinates of a feature pixel in a three-dimensional model. Specifically, a three-dimensional modeling process includes: extracting a feature pixel of each of the plurality of pictures, finding a correspondence between feature pixels in different pictures, and calculating a three-dimensional pose of a camera (including a location and orientation information of the camera in space) and coordinates of the feature pixel in three-dimensional space based on two-dimensional coordinates of each feature pixel and the foregoing correspondence. Further, optimal solutions of the camera parameter and the coordinates of the feature pixel in the three-dimensional model are obtained by using the model processing method provided in this embodiment of this application. In this case, the first independent variable includes a parameter of the three-dimensional pose of the camera and the coordinates of the feature pixel projected into the three-dimensional space. It should be understood that the example herein is merely for ease of understanding an application scenario of this solution, and is not intended to limit this solution.

806: The processor updates a value of the first independent variable by using a Levenberg-Marquardt LM algorithm to obtain a value after update of the first independent variable.

In this embodiment of this application, a specific implementation of step 806 is similar to a specific implementation of step 207. A difference lies in that step 207 is performed by the primary server, and step 806 is performed by the processor in the terminal device. It should be noted that step 806 may be performed by the processor by using an AI processor, may be performed by using a graphics processing unit (graphics processing unit, GPU) or another type of processor, or may be performed in parallel by using a plurality of chips. This is not limited herein.

807: The processor determines whether a convergence condition of the first model is met; and if no, goes to step 803 again, or if yes, obtains solutions of a plurality of first independent variables in the first model.

In this embodiment of this application, a specific implementation of step 807 is similar to a specific implementation of step 209. A difference lies in that step 209 is performed by the primary server, and step 807 is performed by the processor in the terminal device.

This embodiment of this application provides an implementation solution when the model processing system is represented as the terminal device. This expands an application scenario of this solution, and improves implementation flexibility of this solution.

For more intuitive understanding of beneficial effects of this solution, the following describes the beneficial effects brought by embodiments of this application with reference to data in Table 2. In Table 2, an application scenario in which the first model is used for three-dimensional modeling to perform adjustment optimization is used as an example.

provided in this embodiment of this application also occupies less memory, uses shorter time, and has a smaller error.

Figure 9:
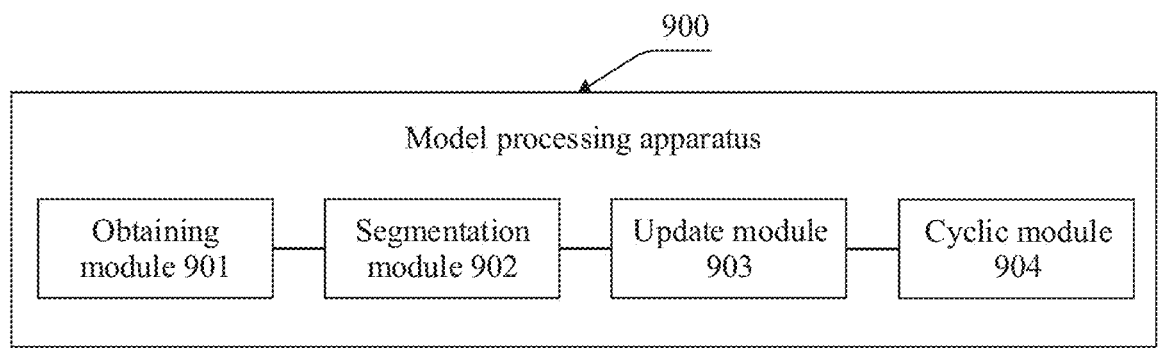
FIG. 9 is a schematic diagram of a structure of a model processing apparatus according to an embodiment of this application.

According to embodiments corresponding to FIG. 1 to FIG. 8, to better implement the foregoing solutions in embodiments of this application, the following further provides related devices configured to implement the foregoing solutions. Specifically, FIG. 9 is a schematic diagram of a structure of a model processing apparatus according to an embodiment of this application. The model processing apparatus 900 includes an obtaining module 901, a segmentation module 902, an update module 903, and a cyclic module 904. The obtaining module 901 is configured to obtain a graph structure corresponding to a first model. The first model includes a plurality of first functions, the first model includes a plurality of first independent variables, the graph structure includes a plurality of nodes and edges between the plurality of nodes, the node in the graph structure corresponds to the first independent variable, and the edges between the plurality of nodes in the graph structure are determined based on the plurality of first functions. The segmentation module 902 is configured to randomly segment the graph structure to obtain at least two first sets, where each first set includes at least one first independent variable. The update module 903 is configured to update a value of the first independent variable in each first set by using a Levenberg-Marquardt LM algorithm. The cyclic module 904 is configured to repeatedly perform the random segmentation operation and the operation of updating the value of the first independent variable in each first set until a convergence condition of the first model is met, to obtain solutions of the plurality of first independent variables in the first model.

In a possible design, each edge in the graph structure corresponds to two nodes, and one node represents one first independent variable in the first model. The segmentation module 902 is specifically configured to: randomly sort a plurality of edges in the graph structure to obtain a plurality of edges arranged in a first order, and obtain a first edge from the plurality of edges in the first order, where the first edge is one of the plurality of edges in the graph structure; when

TABLE 2

| | Ceres-CG | | | This embodiment of this application | | |
|---|---|---|---|---|---|---|
| | Memory consumption | Time | Error | Memory consumption | Time | Error |
| LadyBug | 0.52 GB | 46.7 seconds | 4.15E+05 | 0.24 GB | 5.87 seconds | 3.81E+05 |
| Dubrovnik | 0.9 GB | 320 seconds | 4.95E+05 | 0.43 GB | 13.1 seconds | 4.94E+05 |
| Venice | 3.68 GB | 1992 seconds | 1.66E+06 | 1.74 GB | 53 seconds | 1.65E+06 |

Ceres-CG represents a method provided by Google for solving a model, and LadyBug, Dubrovnik, and Venice are three public databases respectively. When the database LadyBug is selected and the Ceres-CG method is used to solve the model, the memory consumption is 0.52 GB, the used time is 46.7 seconds, and the error is 4.15E+05 pixels. When the solution provided in this embodiment of this application is used to solve the model, the memory consumption is 0.24 GB, the used time is 5.87 seconds, and the error is 3.81E+055 pixels. It can be clearly learned from comparison that this solution occupies less memory, uses shorter time, and has a smaller error. When the database Dubrovnik and the database Venice are selected, the solution neither of two first independent variables corresponding to the first edge is paired, pair the two first independent variables corresponding to the first edge to obtain a first subset; and combine a plurality of first subsets corresponding to the graph structure to obtain the at least two first sets.

In a possible design, the segmentation module 902 is specifically configured to obtain, based on the edges between the plurality of nodes in the graph structure, association degree information corresponding to the plurality of first subsets. The association degree information indicates an association degree between all of the plurality of first subsets, the association degree information includes a first association degree between a second subset and a third subset, both the second subset and the third subset are any two different subsets of the plurality of first subsets, the first association degree is determined based on an association degree between an independent variable in the second subset and an independent variable in the third subset, and more edges between two nodes indicate a higher association degree between independent variables to which the nodes point. The segmentation module 902 combines, based on the association degree information corresponding to the plurality of first subsets, the plurality of first subsets corresponding to the graph structure, where a high association degree between two first subsets indicates a high probability of combining the two first subsets.

In a possible design, the segmentation module 902 is further configured to: if two first independent variables corresponding to a second edge exist in two different first sets, remove the two first independent variables corresponding to the second edge from the two different first sets, and respectively determine the two first independent variables corresponding to the second edge as two isolated first independent variables, where the second edge is any one of the plurality of edges in the graph structure. The update module 903 is specifically configured to update the value of the first independent variable in each first set and a value of the isolated first independent variable by using the Levenberg-Marquardt LM algorithm. The cyclic module 904 is specifically configured to perform the random segmentation operation and the operation of updating the first independent variable in each first set and the value of the isolated first independent variable.

In a possible design, the update module 903 is specifically configured to: obtain a second function corresponding to the first independent variable in the first set, where the second function is determined based on the plurality of first functions included in the first model; obtain a function value of the second function through calculation by using the Levenberg-Marquardt LM algorithm and based on a first value of each first independent variable in the first set and the second function, where the first value is a value of the first independent variable before update; calculate, by using the Levenberg-Marquardt LM algorithm, a Jacobian matrix corresponding to the second function, where the Jacobian matrix includes a derivative of a first scalar with respect to a second independent variable, the first scalar is a sum of values of all second functions corresponding to the first independent variable in the first set, the second independent variable is an independent variable forming at least one second function, different second independent variables have different locations in the second function, and different first independent variables have different identifiers; and generate a second value of the first independent variable in the first set by using the Levenberg-Marquardt LM algorithm and based on the first value of each first independent variable in the first set, the function value of the second function, and the Jacobian matrix, wherein the second value is a value after update.

In a possible design, the convergence condition of the first model is that a value of the first model is less than the first threshold, or a difference between the second value and the first value is less than a second threshold.

In a possible design, the first model is a least square model, and the first model is used in any one of the following application scenarios: three-dimensional modeling, image fusion, face reconstruction, and grid deformation.

It should be noted that content such as information exchange between and an execution process and technical effects of the modules/units in the model processing apparatus 900 is based on a same concept as the method embodiments corresponding to FIG. 5 and FIG. 6 in this application. For specific content, refer to the description in the foregoing method embodiments in this application. Details are not described herein again.

Figure 10:
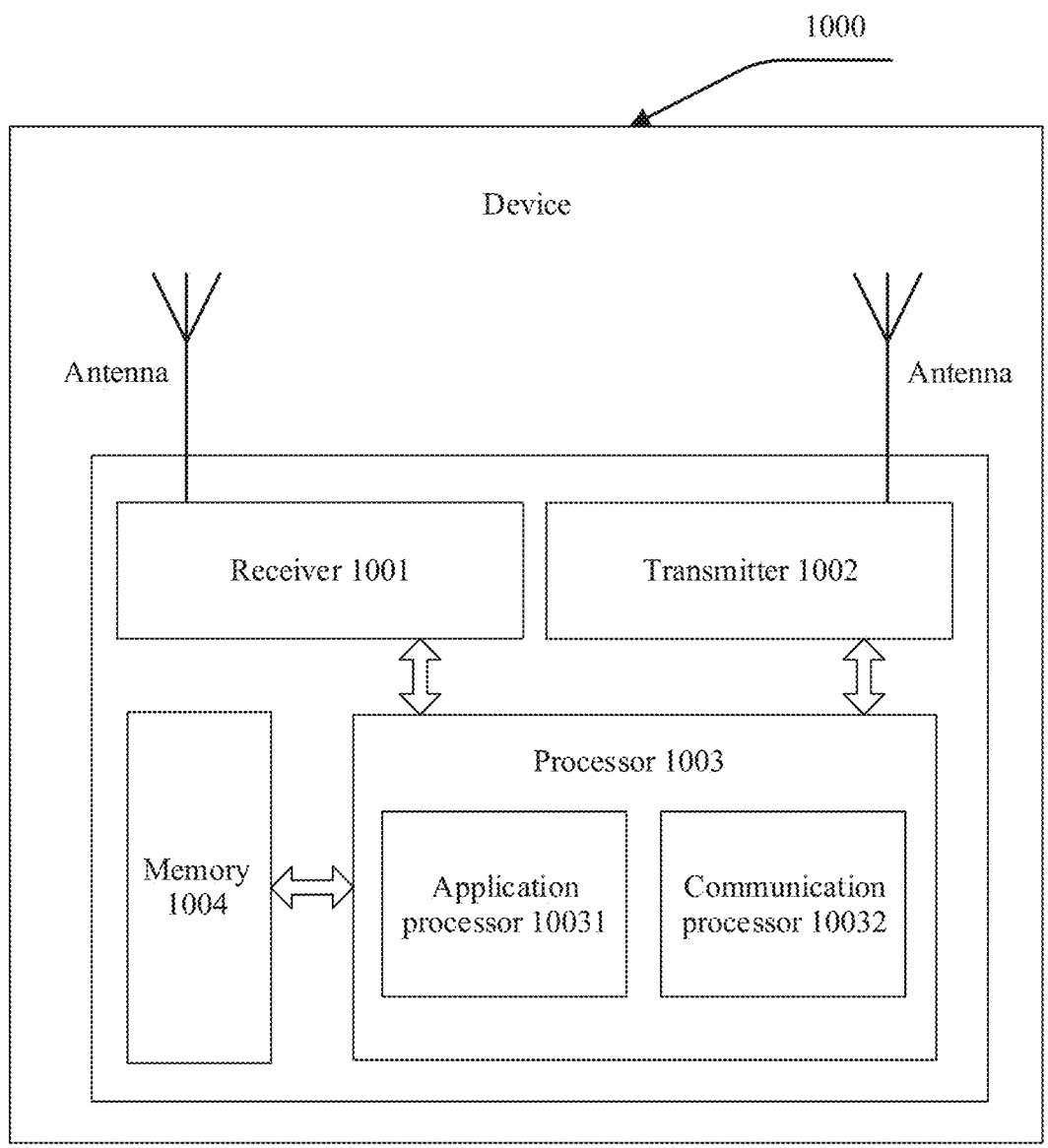
FIG. 10 is a schematic diagram of a structure of a terminal device according to an embodiment of this application.

The following describes a model processing apparatus provided in an embodiment of this application. When the model processing apparatus is represented in a form of a terminal device, FIG. 10 is a schematic diagram of a structure of a terminal device according to an embodiment of this application. The terminal device 1000 is configured to implement a function of the terminal device in the embodiment corresponding to FIG. 8. Specifically, the terminal device 1000 includes a receiver 1001, a transmitter 1002, a processor 1003, and a memory 1004 (there may be one or more processors 1003 in the terminal device 1000, and one processor is used as an example in FIG. 10). The processor 1003 may include an application processor 10031 and a communication processor 10032. In some embodiments of this application, the receiver 1001, the transmitter 1002, the processor 1003, and the memory 1004 may be connected through a bus or in another manner.

The memory 1004 may include a read-only memory and a random access memory, and provide instructions and data for the processor 1003. A part of the memory 1004 may further include a non-volatile random access memory (NVRAM). The memory 1004 stores a processor and operation instructions, an executable module or a data structure, a subnet thereof, or an extended set thereof. The operation instructions may include various operation instructions to implement various operations.

The processor 1003 controls an operation of the terminal device. In a specific application, the components of the terminal device are coupled together through a bus system. In addition to a data bus, the bus system may further include a power bus, a control bus, a status signal bus, and the like. However, for clear description, various types of buses in the figure are marked as the bus system.

The method disclosed in embodiments of this application may be applied to the processor 1003, or may be implemented by the processor 1003. The processor 1003 may be an integrated circuit chip, and have a signal processing capability. In an implementation process, steps in the methods can be implemented by using a hardware integrated logical circuit in the processor 1003, or by using instructions in a form of software. The processor 1003 may be a general-purpose processor, a digital signal processor (DSP), a microprocessor, or a microcontroller. The processor 1003 may further include an application-specific integrated circuit (ASIC), a field programmable gate array (FPGA) or another programmable logic device, a discrete gate, or a transistor logic device, or a discrete hardware component. The processor 1003 may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly performed by a hardware decoding processor, or may be performed by using a combination of hardware and software modules in the decoding processor. The software module may be located in a mature storage medium in the art, for example, a random access memory, a flash memory, a read-only memory, a programmable read-only memory, an electrically erasable programmable memory, a register, or the like. The storage medium is located in the memory 1004, and the processor 1003 reads information in the memory 1004 and completes the steps in the foregoing methods in combination with hardware of the processor 1003.

The receiver 1001 may be configured to: receive input digital or character information, and generate a signal input related to setting and function control of the terminal device. The transmitter 1002 may be configured to output digital or character information by using a first interface. The transmitter 1002 may further be configured to send instructions to a disk group by using the first interface to modify data in the disk group. The transmitter 1002 may further include a display device such as a display screen.

It should be noted that for specific implementations and beneficial effects of the model processing method performed by the application processor 10031, refer to description in the method embodiments corresponding to FIG. 8. Details are not described herein again.

Figure 11:
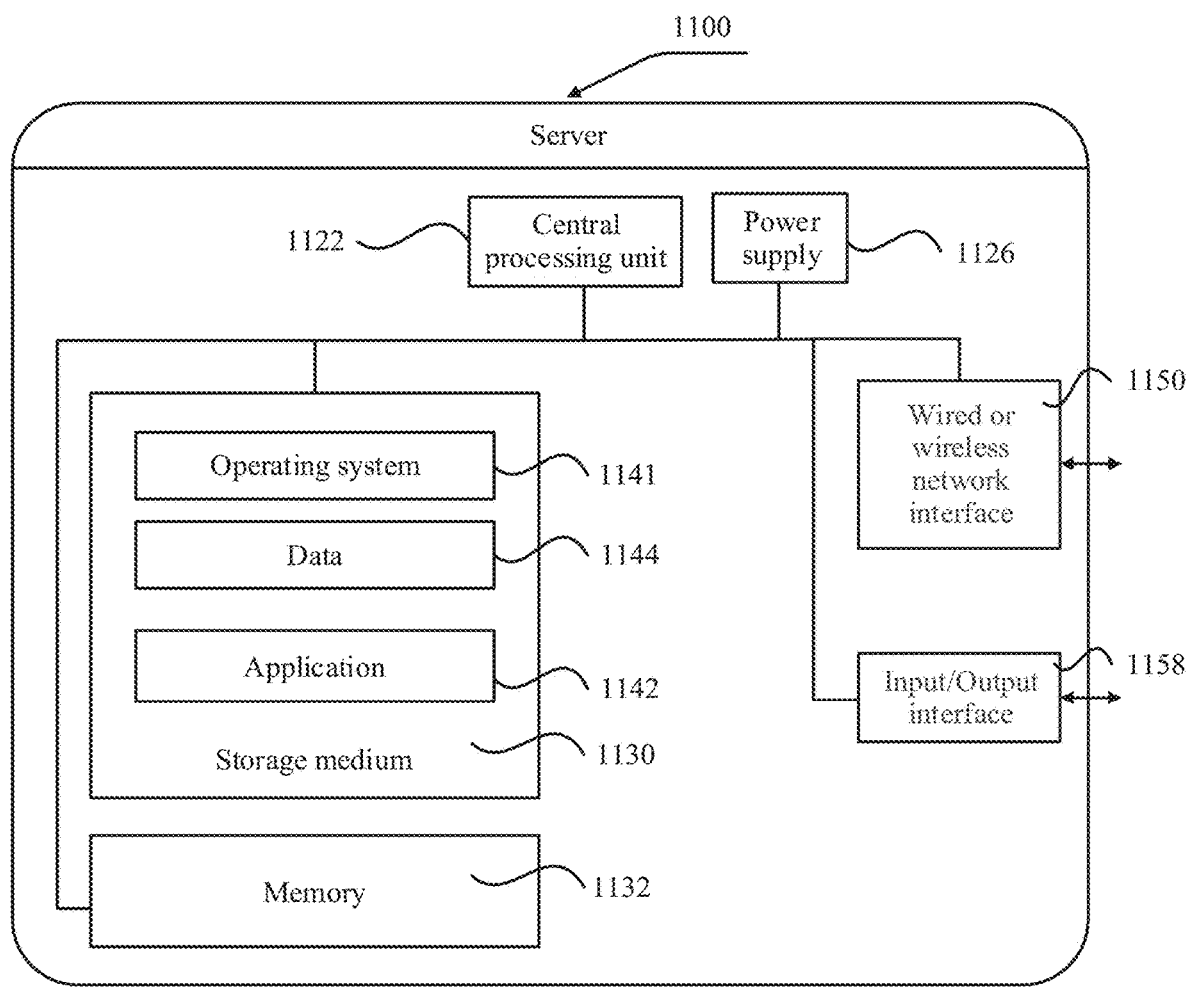
FIG. 11 is a schematic diagram of a structure of a server according to an embodiment of this application.

When the model processing apparatus is represented in a server state, FIG. 11 is a schematic diagram of a structure of a server according to an embodiment of this application. The server 1100 is configured to implement functions of the primary server or the subserver in embodiments corresponding to FIG. 2 to FIG. 7. Specifically, the server 1100 is implemented by one or more servers. The server 1100 may greatly differ due to different configurations or performance, and may include one or more central processing units (CPU) 1122 (for example, one or more processors), a memory 1132, one or more storage media 1130 (for example, one or more mass storage devices) that store an application 1142 or data 1144. The memory 1132 and the storage medium 1130 may perform transitory storage or persistent storage. A program stored in the storage medium 1130 may include one or more modules (not shown in the figure), and each module may include a series of instruction operations for the server. Further, the central processing unit 1122 may be set to communicate with the storage medium 1130, and execute, on the server 1100, the series of instruction operations in the storage medium 1130.

The server 1100 may further include one or more power supplies 1126, one or more wired or wireless network interfaces 1150, one or more input/output interfaces 1158, and/or one or more operating systems 1141, for example, Windows Server™, Mac OS X™, Unix™, Linux™, and FreeBSD™.

It should be noted that for specific implementations and beneficial effects of the model processing method performed by the central processing unit 1122, refer to description in the method embodiments corresponding to FIG. 2 to FIG. 7. Details are not described herein again.

An embodiment of this application further provides a computer program product. When the computer program product runs on a computer, the computer is enabled to perform the steps performed by the model processing apparatus in the methods described in embodiments shown in FIG. 2 and FIG. 8.

An embodiment of this application further provides a computer-readable storage medium. The computer-readable storage medium stores a program used for signal processing. When the program runs on a computer, the computer is enabled to perform the steps performed by the model processing apparatus in the methods described in embodiments shown in FIG. 2 and FIG. 8.

The model processing apparatus, the terminal device, or the server provided in embodiments of this application may be specifically a chip. The chip includes a processing unit and a communication unit. The processing unit may be, for example, a processor, and the communication unit may be, for example, an input/output interface, a pin, a circuit, or the like. The processing unit may execute computer-executable instructions stored in the storage unit, so that the chip in the model processing apparatus performs the model processing method described in embodiments shown in FIG. 2 to FIG. 8. Optionally, the storage unit is a storage unit in the chip, for example, a register or a cache; or the storage unit may be a storage unit that is in a radio access device and that is located outside the chip, for example, a read-only memory (ROM), another type of static storage device that can store static information and instructions, or a random access memory (RAM).

The processor mentioned anywhere above may be a general-purpose central processing unit, a microprocessor, an ASIC, or one or more integrated circuits that are configured to control program execution of the method according to the first aspect.

In addition, it should be noted that the described apparatus embodiments are merely examples. The units described as separate parts may or may not be physically separate, and parts displayed as units may or may not be physical units, and may be located in one location, or may be distributed on a plurality of network units. Some or all the modules may be selected based on an actual requirement to achieve the objectives of the solutions of embodiments. In addition, in the accompanying drawings of the apparatus embodiments provided in this application, connection relationships between the modules indicate that the modules have communication connections with each other, which may be specifically implemented as one or more communication buses or signal cables.

Based on the description of the foregoing implementations, a person skilled in the art may clearly understand that this application may be implemented by software in addition to necessary universal hardware, or certainly may be implemented by dedicated hardware, including an application-specific integrated circuit, a dedicated CPU, a dedicated memory, a dedicated component, and the like. Generally, any function performed by a computer program can be easily implemented by using corresponding hardware, and a specific hardware structure used to achieve a same function may be of various forms, for example, in a form of an analog circuit, a digital circuit, an application-specific circuit, or the like. However, in this application, a software program implementation is a better implementation in most cases. Based on such an understanding, the technical solutions of this application essentially or the part contributing to the conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, an execution device, or a network device) to perform the methods in embodiments of this application.

All or some of foregoing embodiments may be implemented by using software, hardware, firmware, or any combination thereof. When the software is used to implement embodiments, all or a part of embodiments may be implemented in a form of a computer program product.

The computer program product includes one or more computer instructions. When the computer program instructions are loaded and executed on the computer, the procedures or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, training device, or data center to another website, computer, execution device, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as an execution device or a data center, integrating one or more usable media. The usable medium may be a magnetic medium (for example, a floppy disk, a hard disk, or a magnetic tape), an optical medium (for example, a DVD), a semiconductor medium (for example, a Solid-State Disk (SSD)), or the like.

What is claimed is:

1. A method, wherein the method comprises:
receiving, by a primary server in a server cluster, a first model sent by a client, wherein the server cluster includes the primary server and a plurality of subservers, the primary server includes at least one processor, each subserver includes an artificial intelligence (AI) processor, the first model is used to resolve a problem in at least one of three-dimensional modeling, image fusion, face reconstruction, or grid deformation, the first model comprises a plurality of first independent variables, and the plurality of first independent variables occupy a first quantity of computer memory resources that is greater than a threshold number;
generating, by the at least one processor of the primary server, a graph structure corresponding to the first model, wherein the first model comprises a plurality of first functions, the graph structure comprises a plurality of nodes and edges between the plurality of nodes, the nodes in the graph structure correspond to the first independent variables, and the edges between the plurality of nodes in the graph structure are determined based on the plurality of first functions;
randomly segmenting, by the at least one processor of the primary server, the graph structure to obtain at least two first sets, wherein each first set comprises at least one first independent variable;
sending, by the at least one processor of the primary server, the at least two first sets to at least two subservers of the plurality of subservers;
receiving, by the at least one processor of the primary server from the at least two subservers, a value of the at least one first independent variable in each first set of the at least two first sets;
updating, by the at least one processor of the primary server, the value of the at least one first independent variable in each first set by using a Levenberg-Marquardt (LM) algorithm, wherein updating the value of the at least one first independent variable in each first set comprises storing the at least one first independent variable in each first set using a second quantity of computer memory resources that is less than the threshold number;
repeatedly performing, by the at least one processor of the primary server, the random segmentation operation and the updating operation until a convergence condition of the first model is met to obtain solutions of the plurality of first independent variables in the first model; and
sending, by the at least one processor of the primary server, the solutions of the plurality of first independent variables in the first model to the client.

2. The method according to claim 1, wherein:
each edge in the graph structure corresponds to two nodes, and one node represents one first independent variable in the first model; and
the randomly segmenting the graph structure to obtain at least two first sets comprises:
randomly sorting a plurality of edges in the graph structure to obtain a plurality of edges arranged in a first order, and obtaining a first edge from the plurality of edges in the first order, wherein the first edge is one of the plurality of edges in the graph structure;
when neither of two first independent variables corresponding to the first edge is paired, pairing the two first independent variables corresponding to the first edge to obtain a first subset; and
combining a plurality of first subsets corresponding to the graph structure to obtain the at least two first sets.

3. The method according to claim 2, wherein the combining a plurality of first subsets corresponding to the graph structure comprises:
obtaining, based on the edges between the plurality of nodes in the graph structure, association degree information corresponding to the plurality of first subsets, wherein the association degree information indicates an association degree between all of the plurality of first subsets, the association degree information comprises a first association degree between a second subset and a third subset, both the second subset and the third subset are any two different subsets of the plurality of first subsets, the first association degree is determined based on an association degree between an independent variable in the second subset and an independent variable in the third subset, and more edges between two nodes indicate a higher association degree between independent variables to which the nodes point; and
combining, based on the association degree information corresponding to the plurality of first subsets, the plurality of first subsets corresponding to the graph structure, wherein a higher association degree between two first subsets indicates a higher probability of combining the two first subsets.

4. The method according to claim 2, wherein after the combining a plurality of first subsets corresponding to the graph structure to obtain the at least two first sets, the method further comprises:
when two first independent variables corresponding to a second edge exist in two different first sets, removing the two first independent variables corresponding to the second edge from the two different first sets, and respectively determining the two first independent variables corresponding to the second edge as two isolated first independent variables, wherein the second edge is any one of the plurality of edges in the graph structure;
wherein the updating a value of the at least one first independent variable in each first set by using a Levenberg-Marquardt (LM) algorithm comprises:
updating the value of the at least one first independent variable in each first set and a value of an isolated first independent variable by using the Levenberg-Marquardt (LM) algorithm; and
wherein the repeatedly performing the random segmentation operation and the updating operation comprises:
repeatedly performing the random segmentation operation and the updating operation of the value of the at least one first independent variable in each first set and the value of the isolated first independent variable.

5. The method according to claim 1, wherein the updating a value of the at least one first independent variable in each first set by using a Levenberg-Marquardt (LM) algorithm comprises:
obtaining a second function corresponding to the at least one first independent variable in the first set, wherein the second function is determined based on the plurality of first functions comprised in the first model;
obtaining a function value of the second function through calculation by using the Levenberg-Marquardt (LM) algorithm and based on a first value of each first independent variable in the first set and the second function, wherein the first value is a value of the first independent variable before update;
calculating, by using the Levenberg-Marquardt (LM) algorithm, a Jacobian matrix corresponding to the second function, wherein the Jacobian matrix comprises a derivative of a first scalar with respect to a second independent variable, the first scalar is a sum of values of all second functions corresponding to the at least one first independent variable in the first set, the second independent variable is an independent variable forming the second function, different second independent variables have different locations in the second function, and different first independent variables have different identifiers; and
generating a second value of the at least one first independent variable in the first set by using the Levenberg-Marquardt (LM) algorithm and based on the first value of each first independent variable in the first set, the function value of the second function, and the Jacobian matrix, wherein the second value is a value after update.

6. The method according to claim 5, wherein the convergence condition of the first model is that a value of the first model is less than a first threshold, or a difference between the second value and the first value is less than a second threshold.

7. The method according to claim 1, wherein updating the value of the at least one first independent variable in each first set comprises updating, by the at least two subservers respectively, the value of the at least one first independent variable in each first set of the at least two first sets.

8. An apparatus, comprising:
at least one processor; and
at least one memory coupled to the at least one processor and storing program instructions which, when executed by the at least one processor, cause the at least one processor to:
receive a first model sent by a client, wherein the apparatus includes a primary server in a server cluster, the server cluster includes the primary server and a plurality of subservers, each subserver includes an artificial intelligence (AI) processor, the first model is used to resolve a problem in at least one of three-dimensional modeling, image fusion, face reconstruction, or grid deformation, the first model comprises a plurality of first independent variables, and the plurality of first independent variables occupy a first quantity of computer memory resources that is greater than a threshold number;
generate a graph structure corresponding to the first model, wherein the first model comprises a plurality of first functions, the graph structure comprises a plurality of nodes and edges between the plurality of nodes, the nodes in the graph structure correspond to the first independent variables, and the edges between the plurality of nodes in the graph structure are determined based on the plurality of first functions;
randomly segment the graph structure to obtain at least two first sets, wherein each first set comprises at least one first independent variable;
send the at least two first sets to at least two subservers of the plurality of subservers;
receive, from the at least two subservers, a value of the at least one first independent variable in each first set of the at least two first sets;
update the value of the at least one first independent variable in each first set by using a Levenberg-Marquardt (LM) algorithm, wherein updating the value of the at least one first independent variable in each first set comprises storing the at least one first independent variable in each first set using a second quantity of computer memory resources that is less than the threshold number;
repeatedly perform the random segmentation operation and the updating operation until a convergence condition of the first model is met to obtain solutions of the plurality of first independent variables in the first model; and
send the solutions of the plurality of first independent variables in the first model to the client.

9. The apparatus according to claim 8, wherein:
each edge in the graph structure corresponds to two nodes, and one node represents one first independent variable in the first model; and
the randomly segmenting the graph structure to obtain at least two first sets comprises:
randomly sorting a plurality of edges in the graph structure to obtain a plurality of edges arranged in a first order, and obtaining a first edge from the plurality of edges in the first order, wherein the first edge is one of the plurality of edges in the graph structure;
when neither of two first independent variables corresponding to the first edge is paired, pairing the two first independent variables corresponding to the first edge to obtain a first subset; and
combining a plurality of first subsets corresponding to the graph structure to obtain the at least two first sets.

10. The apparatus according to claim 9, wherein the combining a plurality of first subsets corresponding to the graph structure comprises:
obtaining, based on the edges between the plurality of nodes in the graph structure, association degree information corresponding to the plurality of first subsets, wherein the association degree information indicates an association degree between all of the plurality of first subsets, the association degree information comprises a first association degree between a second subset and a third subset, both the second subset and the third subset are any two different subsets of the plurality of first subsets, the first association degree is determined based on an association degree between an independent variable in the second subset and an independent variable in the third subset, and more edges between two nodes indicate a higher association degree between independent variables to which the nodes point; and
combining, based on the association degree information corresponding to the plurality of first subsets, the plurality of first subsets corresponding to the graph structure, wherein a higher association degree between two first subsets indicates a higher probability of combining the two first subsets.

11. The apparatus according to claim 9, wherein after the combining a plurality of first subsets corresponding to the graph structure to obtain the at least two first sets, the program instructions, when executed by the at least one processor, further cause the at least one processor to:

when two first independent variables corresponding to a second edge exist in two different first sets, remove the two first independent variables corresponding to the second edge from the two different first sets, and respectively determine the two first independent variables corresponding to the second edge as two isolated first independent variables, wherein the second edge is any one of the plurality of edges in the graph structure;

wherein the updating a value of the at least one first independent variable in each first set by using a Levenberg-Marquardt (LM) algorithm comprises:
updating the value of the at least one first independent variable in each first set and a value of an isolated first independent variable by using the Levenberg-Marquardt (LM) algorithm; and wherein the repeatedly performing the random segmentation operation and the updating operation comprises:
repeatedly performing the random segmentation operation and the updating operation of the value of the at least one first independent variable in each first set and the value of the isolated first independent variable.

12. The apparatus according to claim 9, wherein the updating a value of the at least one first independent variable in each first set by using a Levenberg-Marquardt (LM) algorithm comprises:

obtaining a second function corresponding to the at least one first independent variable in the first set, wherein the second function is determined based on the plurality of first functions comprised in the first model;

obtaining a function value of the second function through calculation by using the Levenberg-Marquardt (LM) algorithm and based on a first value of each first independent variable in the first set and the second function, wherein the first value is a value of the first independent variable before update;

calculating, by using the Levenberg-Marquardt (LM) algorithm, a Jacobian matrix corresponding to the second function, wherein the Jacobian matrix comprises a derivative of a first scalar with respect to a second independent variable, the first scalar is a sum of values of all second functions corresponding to the at least one first independent variable in the first set, the second independent variable is an independent variable forming the second function, different second independent variables have different locations in the second function, and different first independent variables have different identifiers; and generating a second value of the at least one first independent variable in the first set by using the Levenberg-Marquardt (LM) algorithm and based on the first value of each first independent variable in the first set, the function value of the second function, and the Jacobian matrix, wherein the second value is a value after update.

13. The apparatus according to claim 12, wherein the convergence condition of the first model is that a value of the first model is less than a first threshold, or a difference between the second value and the first value is less than a second threshold.

14. The apparatus according to claim 8, wherein the first model is a least square model.

15. A non-transitory computer-readable storage medium, storing one or more instructions that, when executed by at least one processor of a primary server in a server cluster, cause the at least one processor to:

receive a first model sent by a client, wherein the server cluster includes the primary server and a plurality of subservers, each subserver includes an artificial intelligence (AI) processor, the first model is used to resolve a problem in at least one of three-dimensional modeling, image fusion, face reconstruction, or grid deformation, the first model comprises a plurality of first independent variables, and the plurality of first independent variables occupy a first quantity of computer memory resources that is greater than a threshold number;

generate a graph structure corresponding to the first model, wherein the first model comprises a plurality of first functions, the graph structure comprises a plurality of nodes and edges between the plurality of nodes, the nodes in the graph structure correspond to the first independent variables, and the edges between the plurality of nodes in the graph structure are determined based on the plurality of first functions;

randomly segment the graph structure to obtain at least two first sets, wherein each first set comprises at least one first independent variable;

send the at least two first sets to at least two subservers of the plurality of subservers;

receive, from the at least two subservers, a value of the at least one first independent variable in each first set of the at least two first sets;

update the value of the at least one first independent variable in each first set by using a Levenberg-Marquardt (LM) algorithm, wherein updating the value of the at least one first independent variable in each first set comprises storing the at least one first independent variable in each first set using a second quantity of computer memory resources that is less than the threshold number;

repeatedly perform the random segmentation operation and the updating operation until a convergence condition of the first model is met to obtain solutions of the plurality of first independent variables in the first model; and send the solutions of the plurality of first independent variables in the first model to the client.

16. The non-transitory computer-readable storage medium according to claim 15, wherein:

each edge in the graph structure corresponds to two nodes, and one node represents one first independent variable in the first model; and the randomly segmenting the graph structure to obtain at least two first sets comprises:
randomly sorting a plurality of edges in the graph structure to obtain a plurality of edges arranged in a first order, and obtaining a first edge from the plurality of edges in the first order, wherein the first edge is one of the plurality of edges in the graph structure;
when neither of two first independent variables corresponding to the first edge is paired, pair the two first independent variables corresponding to the first edge to obtain a first subset; and combining a plurality of first subsets corresponding to the graph structure to obtain the at least two first sets.

17. The non-transitory computer-readable storage medium according to claim 16, wherein the combining a plurality of first subsets corresponding to the graph structure comprises:
- obtaining, based on the edges between the plurality of nodes in the graph structure, association degree information corresponding to the plurality of first subsets, wherein the association degree information indicates an association degree between all of the plurality of first subsets, the association degree information comprises a first association degree between a second subset and a third subset, both the second subset and the third subset are any two different subsets of the plurality of first subsets, the first association degree is determined based on an association degree between an independent variable in the second subset and an independent variable in the third subset, and more edges between two nodes indicate a higher association degree between independent variables to which the nodes point; and
- combining, based on the association degree information corresponding to the plurality of first subsets, the plurality of first subsets corresponding to the graph structure, wherein a higher association degree between two first subsets indicates a higher probability of combining the two first subsets.

18. The non-transitory computer-readable storage medium according to claim 16, wherein after the combining a plurality of first subsets corresponding to the graph structure to obtain the at least two first sets, the one or more instructions, when executed by the at least one processor, further cause the at least one processor to:
- when two first independent variables corresponding to a second edge exist in two different first sets, removing the two first independent variables corresponding to the second edge from the two different first sets, and respectively determining the two first independent variables corresponding to the second edge as two isolated first independent variables, wherein the second edge is any one of the plurality of edges in the graph structure;
- wherein the updating a value of the at least one first independent variable in each first set by using a Levenberg-Marquardt (LM) algorithm comprises:
  - updating the value of the at least one first independent variable in each first set and a value of an isolated first independent variable by using the Levenberg-Marquardt (LM) algorithm; and
- wherein the repeatedly performing the random segmentation operation and the updating operation comprises:
  - repeatedly performing the random segmentation operation and the updating operation of the value of the at least one first independent variable in each first set and the value of the isolated first independent variable.

19. The non-transitory computer-readable storage medium according to claim 15, wherein the updating a value of the at least one first independent variable in each first set by using a Levenberg-Marquardt (LM) algorithm comprises:
- obtaining a second function corresponding to the at least one first independent variable in the first set, wherein the second function is determined based on the plurality of first functions comprised in the first model;
- obtaining a function value of the second function through calculation by using the Levenberg-Marquardt (LM) algorithm and based on a first value of each first independent variable in the first set and the second function, wherein the first value is a value of the first independent variable before update;
- calculating, by using the Levenberg-Marquardt (LM) algorithm, a Jacobian matrix corresponding to the second function, wherein the Jacobian matrix comprises a derivative of a first scalar with respect to a second independent variable, the first scalar is a sum of values of all second functions corresponding to the at least one first independent variable in the first set, the second independent variable is an independent variable forming the second function, different second independent variables have different locations in the second function, and different first independent variables have different identifiers; and
- generating a second value of the at least one first independent variable in the first set by using the Levenberg-Marquardt (LM) algorithm and based on the first value of each first independent variable in the first set, the function value of the second function, and the Jacobian matrix, wherein the second value is a value after update.

20. The non-transitory computer-readable storage medium according to claim 15, wherein the first model is a least square model.

* * * * *